(12) United States Patent
Shimohara

(10) Patent No.: US 7,703,907 B2
(45) Date of Patent: Apr. 27, 2010

(54) INK COMPOSITION, INKJET-RECORDING METHOD AND PRINTED MATERIAL

(75) Inventor: Norihide Shimohara, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 833 days.

(21) Appl. No.: 11/389,205

(22) Filed: Mar. 27, 2006

(65) Prior Publication Data

US 2006/0222832 A1 Oct. 5, 2006

(30) Foreign Application Priority Data

Mar. 29, 2005 (JP) .............................. 2005-096246

(51) Int. Cl.
*C09D 11/00* (2006.01)

(52) U.S. Cl. .................................. 347/100; 106/31.13

(58) Field of Classification Search .................. 347/100; 106/31.13
See application file for complete search history.

(56) References Cited

U.S. PATENT DOCUMENTS

2003/0128264 A1* 7/2003 Ishikawa et al. ............ 347/102
2004/0009294 A1* 1/2004 Kuribayashi et al. ........ 427/212
2004/0130606 A1* 7/2004 Tawaraya et al. ............ 347/100
2005/0057630 A1* 3/2005 Hiroki et al. ................ 347/100

FOREIGN PATENT DOCUMENTS

| JP | A 2000-169552 | 6/2000 |
| JP | A 2001-220526 | 8/2001 |
| JP | A 2001-222105 | 8/2001 |
| JP | A 2003-221528 | 8/2003 |
| JP | A 2003-221530 | 8/2003 |
| JP | A 2003-221532 | 8/2003 |
| JP | A 2004-10625 | 1/2004 |

* cited by examiner

*Primary Examiner*—Stephen Meier
*Assistant Examiner*—Laura E Martin
(74) *Attorney, Agent, or Firm*—Sheldon J. Moss; Chad M. Herring

(57) ABSTRACT

An ink composition including a cationically polymerizable compound having a styryl or α-methylstyryl group such as 4-methylstyrene and a photocationic polymerization initiator. The ink composition preferably further includes another cationically polymerizable compound having at least one group selected from oxirane and oxetane groups.

17 Claims, No Drawings

INK COMPOSITION, INKJET-RECORDING METHOD AND PRINTED MATERIAL

CROSS-REFERENCE TO RELATED APPLICATION

This application claims priority under 35USC 119 from Japanese Patent Application No. 2005-096246, the disclosure of which is incorporated by reference herein.

BACKGROUND OF THE INVENTION

1. Field of the Invention

The present invention relates to an ink composition and an inkjet-recording method and a printed material using the same.

2. Description of the Related Art

Aqueous inkjet ink is lower in water resistance and often causes ink bleeding when printed on plain paper. It also had the problems that it was difficult to form an image when printed on a non-water absorbing recording medium such as plastic sheet because the ink droplet is adhered thereto weakly, it was necessary to dry the printed image without stacking of printed media immediately after printing because the solvent therein is vaporized extremely slowly, and thus, the image often causes ink bleeding.

Ultraviolet ray-hardening inks employing a multifunctional monomer superior in adhesiveness to recording medium were developed as the inks suitable for printing on non-water absorbing recording medium, but these inks, which were dispersed in water, were dried more slowly and could not give a favorable full color image. It has been practiced to use a volatile organic solvent as the ink solvent for improving the drying efficiency, but it was necessary to use a solvent, such as methylethylketone or ethanol, higher in volatility and flammability for further improvement in the drying efficiency.

Inkjet inks that harden and deposit not by vaporization of ink solvent but by irradiation of radiation ray were developed to solve these problems. For example, JP-A Nos. 2003-221528, 2003-221532, and 2003-221530 disclose inks containing a monomer having a polymerizable group and an oil-soluble dye. Alternatively, JP-A No. 2001-222105 discloses a photopolymerizable composition containing a photopolymerizable compound and a photopolymerization initiator. However, these inks still had a problem that the hardening speed was insufficient. Generally, radical polymerization, which is inhibited by oxygen, has a problem that the hardening efficiency of thin film was lower particularly in air.

For that reason, inks employing cationic polymerization, which is resistant to the inhibition by oxygen, were disclosed. For example, JP-A No. 2000-169552 discloses a high-energy ray-hardening composition containing oxirane and oxetane, but it is still insufficient in the hardening speed. Alternatively, JP-A No. 2001-220526 discloses a high-energy ray-hardening composition containing oxirane, oxetane, and a vinylether that was improved in hardening speed, but the composition had problems of deterioration of storage stability and generation of acetaldehyde by decomposition of the vinylether. On the other hand, JP-A No. 2004-10625 discloses a high-energy ray-hardening ink containing additionally a cyclic compound such as tetrahydrofuran, oxepane, or a monocyclic acetal, for improvement in storage stability, but it was still insufficient in hardening speed.

SUMMARY OF THE INVENTION

According to a first aspect of the invention, there is provided an ink composition containing a cationically polymerizable compound having a styryl or α-methylstyryl group and a photocationic polymerization initiator.

According to a second aspect of the invention, there is an inkjet-recording method comprising; ejecting the ink composition of the invention on a recording medium.

According to a third aspect of the invention, there is an inkjet-recording method comprising; hardening the ink composition of the invention.

According to a forth aspect of the invention, there is a inkjet-recording method comprising;

ejecting the ink composition of the invention on a recording medium by an inkjet printer and hardening the ejected ink composition by irradiating it with an active radiation ray.

According to a fifth aspect of the invention, there is a printed material comprising the hardened composition obtained by hardening the ink composition of the invention. In other words the printed material of the invention is prepared by using the ink composition of the invention.

DETAILED DESCRIPTION OF THE INVENTION

The present invention provides an ink composition superior in hardening efficiency and stability. It also provides an inkjet-recording method and a printed material by using the ink composition.

Hereinafter, the present invention will be described in detail.

Ink Composition

The ink composition of the invention contains a cationically polymerizable compound having a styryl or α-methylstyryl group and a photocationic polymerization initiator. The "cationically polymerizable compound" is a compound that polymerizes by the cation or cationic radical generated from a cationic polymerization initiator.

The cationically polymerizable compound may contain other cationically polymerizable compounds in addition to the cationically polymerizable compound having a styryl or α-methylstyryl group.

In such a case, the other cationically polymerizable compound is preferably a compound having at least one group selected from oxirane and oxetane groups.

The cationically polymerizable compound having a styryl or α-methylstyryl group is preferably a compound having an electron-donating functional group on at least one group selected from p- (para) and o- (ortho) positions of the styryl group.

The ink composition of the invention may contain additionally a colorant, and the colorant may be a colorant selected from the group consisting of pigments and oil-soluble dyes.

When the colorant is an oil-soluble dye, the oxidation potential of the oil-soluble dye is preferably at least 1.0 V (vsSCE).

The ink composition of the invention is preferably for use in inkjet printing.

The ink composition of the invention, which contains a highly reactive cationically polymerizable compound having a styryl or α-methylstyryl group, has higher hardening speed and favorable ink stability. Because of its sufficiently high ink-hardening speed and favorable ink stability, it is resistant to clogging and gives a favorable character or an image on a recording medium that is superior in adhesiveness thereto.

Hereinafter, components for the ink composition of the invention will be described respectively.

Cationically Polymerizable Compound Having a Styryl or α-Methylstyryl Group

The cationically polymerizable compound having a styryl or α-methylstyryl group in the invention may be a monomer, an oligomer, or a polymer, and may have one or more substituents.

The ink composition of the invention contains at least one cationically polymerizable compound having a styryl or α-methylstyryl group, and may contain two or more of them in combination.

The number of the styryl or α-methylstyryl groups on the cationically polymerizable compound is preferably 6 or less and more preferably 3 or less. When the number is in the range above, it is possible to obtain an ink composition that is superior both in hardening efficiency and stability (solubility and viscosity).

In the cationically polymerizable compound having a styryl or α-methylstyryl group according to the invention, at least one carbon at p- or o-position of the aromatic ring of the styryl group is preferably substituted with an electron-donating functional group, for improvement in surface-hardening efficiency.

The electron-donating functional group is a group having a negative Hammett substituent constant σ. Examples of the functional groups include amino, hydroxyl, alkoxy, and alkyl groups, and the like. Among them, alkoxy, alkyl, and dimethylamino groups are used favorably, because they are less reactive with the active terminal groups during polymerization.

Examples of the cationically polymerizable compounds having one or more styryl or α-methylstyryl groups include the followings, but the invention is not limited thereby.

Examples of the compounds containing a styryl or α-styryl group, i.e., monofunctional compound, include styrene; 2- and 4-alkylstyrenes such as 2-methylstyrene, 4-methylstyrene, 2,6-methylstyrene, 2-ethylstyrene, 4-ethylstyrene, 2-ethylstyrene, 4-n-butylstyrene, 2-n-butylstyrene, 4-t-butylstyrene, 2-t-butylstyrene, 4-butenylstyrene, and 4-octenylstyrene; 2- and 4-alkoxystyrenes such as 4-methoxystyrene, 2-methoxystyrene, and 4-t-butylstyrene; 4-acetoxystyrene, 4-dimethylaminostyrene, 4-dimethylaminomethylstyrene, 4-glycidylmethylstyrene, 4-hydroxystyrene, 2,4-dialkylstyrenes, 2,4,6-trialkylstyrenes, 2,4-dialkoxystyrenes, 2,4,6-trialkoxystyrenes, and the like.

Examples of the compounds containing two or more styryl or α-styryl groups, i.e., multifunctional styrenes, include bis(4-vinylphenyl)methane, bis(4-vinylphenyl)ethane, bis(4-vinylphenyl)butane, bis(4-vinylphenyl)hexane, bis(4-vinylphenyl)heptane, bis(4-vinylphenyl)octane, bis(4-vinylphenoxy)hexane, ethylene glycol bis(4-vinylphenyl)ether, propylene glycol bis(4-vinylphenyl)ether, 1,6-hexanediol bis(4-vinylphenyl)ether, 1,8-octanediol bis(4-vinylphenyl)ether, oligoethylene glycol bis(4-vinylphenyl)ether, polyethylene glycol bis(4-vinylphenylether), oligopropylene glycol bis(4-vinylphenyl)ethers, polypropylene glycol bis(4-vinylphenyl)ether, glycerol tris(4-vinylphenyl)ether, and the like.

The total content of the cationically polymerizable compounds having a styryl or α-methylstyryl group is preferably in the range of 5% by mass to 95% by mass, more preferably 20% by mass to 95% by mass, and most preferably 30% by mass to 95% by mass, with respect to the total mass of the ink composition, from the viewpoints of the hardening efficiency and the storability of ink composition.

Other Cationically Polymerizable Compound

In the invention, other cationically polymerizable compounds may be used in combination with the cationically polymerizable compound having a styryl or α-methylstyryl group as long as the effect of this invention is not impaired. In such a case, the content of other cationically polymerizable compounds is preferably 5% by mass to 90% by mass, more preferably 10% by mass to 90% by mass, and still more preferably 30% by mass to 90% by mass, with respect to the total cationic polymerization compounds in ink composition.

Any of generally known cationically polymerizable group-containing compounds, either monomer, oligomer, or polymer, may be used as the other cationically polymerizable compounds that may be used in combination with the cationically polymerizable compound having a styryl or α-methylstyryl group. Examples of the other cationically polymerizable compounds include the compounds exemplified below, but the invention is not limited thereto; and known cationically polymerizable compounds may be used in an amount in the range that does not impair the advantageous effects of the invention. In addition, one or more of cationically polymerizable compounds may be used, for adjustment of reaction rate, the physical properties of ink and hardened film, and the like.

Among the other cationically polymerizable compounds above, a compound having at least one group selected from oxirane and oxetane groups is preferably used in the composition of the invention, for further improvement in adhesiveness. These compounds are used in an amount of 5% by mass to 90% by mass with respect to the total amount of the cationically polymerizable compounds contained in ink composition and preferably 20% by mass to 90% by mass for reduction in volumetric shrinkage.

The oxirane group-containing compounds above (oxirane compounds, i.e., epoxy compounds) and the oxetane group-containing compounds (oxetane compounds) may be used alone or in combination of two or more respectively. It is preferable to use at least one oxetane compound and at least one oxirane compound in combination, for improvement in hardening speed and degree. In such a case, the content ratio of oxirane compounds to oxetane compounds in the ink composition is preferably 40:60 to 90:10. When the content ratio is in the range above, it is possible to obtain an ink composition having well-balanced hardening efficiency and speed.

Oxirane Compound

The oxirane compounds include, for example, aromatic and alicyclic epoxides. The aromatic epoxides are, for example, di- or poly-glycidylethers prepared in reaction of a polyvalent phenol having at least one aromatic ring or an alkylene oxide adduct thereof with epichlorohydrin, and examples thereof include di- or poly-glycidylethers of bisphenol A or the alkylene oxide adducts thereof, di- or poly-glycidylethers of hydrogenated bisphenol A or the alkylene oxide adducts thereof, novolak epoxy resins, and the like. The alkylene oxides include ethylene oxide, propylene oxide, and the like.

Favorable alicyclic epoxides include cylcohexene oxide- or cyclopentene oxide-containing compounds obtained by epoxidizing a compound having at least one cycloalkane ring such as cyclohexene or cyclopentene ring with a suitable oxidizing agent such as hydrogen peroxide or peracid. Aliphatic epoxides include, for example, di- or poly-glycidylethers of an aliphatic polyvalent alcohol or the alkylene oxide adducts thereof, and typical examples thereof include alkylene glycol diglycidylethers such as ethylene glycol diglycidylether, propylene glycol diglycidylether, and 1,6-hexanediol diglycidylether; polyvalent alcohol polyglycidylethers such as di- or tri-glycidylethers of glycerol or the alkylene oxide adducts thereof; polyalkylene glycol diglycidylethers such as diglycidylethers of polyethylene glycol or the alkylene oxide adducts thereof and diglycidylethers of polypropylene glycol or the alkylene oxide adducts thereof; and the like. The alkylene oxides include ethylene oxide, propylene oxide, and the like.

Among these oxirane compounds, aromatic and alicyclic epoxides are preferable, and particularly preferable are alicyclic epoxides, from the viewpoints of hardening speed.

Oxirane compounds having fewer functional groups, which are easier in adjusting the solubility and viscosity of ink composition, are preferable.

Examples of the monofunctional epoxides for use in the invention include phenylglycidylether, p-tert-butylphenylglycidylether, butylglycidylether, 2-ethylhexylglycidylether, allylglycidylether, 1,2-butylene oxide, 1,3-butadiene monooxide, 1,2-epoxydodecane, epichlorohydrin, 1,2-epoxydecane, styrene oxide, cylcohexene oxide, 3-methacryloyloxymethylcylcohexene oxide, 3-acryloyloxymethylcylcohexene oxide, 3-vinylcylcohexene oxide, and the like.

Examples of the multifunctional epoxides include bisphenol A diglycidylether, bisphenol F diglycidylether, bisphenol S diglycidylether, brominated bisphenol A diglycidylether, brominated bisphenol F diglycidylether, brominated bisphenol S diglycidylether, epoxy novolak resins, hydrogenated bisphenol A diglycidylethers, hydrogenated bisphenol F glycidylethers, hydrogenated bisphenol S diglycidylethers, 3,4-epoxycyclohexylmethyl-3',4'-epoxycyclohexane carboxylate, 2-(3,4-epoxycyclohexyl-5,5-spiro-3,4-epoxy)cyclohexane-meta-dioxane, bis(3,4-epoxycyclohexylmethyl)adipate, vinylcylcohexene oxide, 4-vinyl epoxycyclohexane, bis(3,4-epoxy-6-methylcyclohexylmethyl)adipate, 3,4-epoxy-6-methylcyclohexyl-3',4'-epoxy-6'-methylcyclohexane carboxylate, methylene-bis(3,4-epoxycyclohexane), dicyclopentadiene diepoxide, ethylene glycol di(3,4-epoxycyclohexylmethyl)ether, ethylene bis(3,4-epoxycyclohexanecarboxylate), epoxyhexahydrodioctyl phthalate, di-2-ethylhexylepoxy hexahydrophthalate, 1,4-butanediol diglycidylether, 1,6-hexanediol diglycidylether, glycerol triglycidylether, trimethylolpropane triglycidylether, polyethylene glycol diglycidylether, polypropylene glycol diglycidylethers, 1,1,3-tetradecadiene dioxide, limonene dioxide, 1,2,7,8-diepoxyoctane, 1,2,5,6-diepoxycyclooctane, and the like.

Oxetane Compound

The oxetane compound according to the invention is a compound having an oxetane ring, and any one of the known oxetane compounds, for example described in JP-A Nos. 2001-220526, 2001-310937 and 2003-341217, which is incorporated by reference herein, may be used as it is properly selected.

The oxetane ring-containing compound for use in the ink composition of the invention is preferably a compound having 1 to 4 oxetane rings in the structure, and among them, preferably used are compounds having 1 to 2 oxetane rings, from the viewpoints of the viscosity and the tackiness of ink composition. Use of such a compound allows easier control of the viscosity of ink composition in the range favorable in handling and improving the adhesiveness between ink and recording medium after hardening.

The compounds having one to two oxetane rings in the molecule include the compounds represented by the following Formulae (1) to (3), and the like.

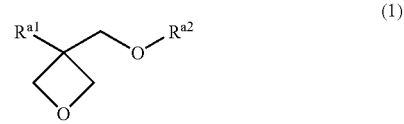

(1)

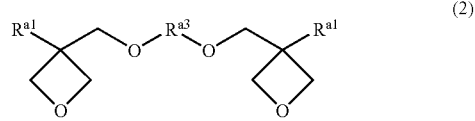

(2)

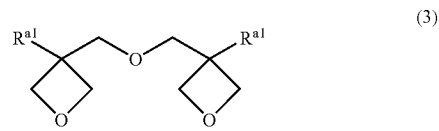

(3)

$R^{a1}$ represents a hydrogen atom, an alkyl group having 1 to 6 carbons, a fluoroalkyl group having 1 to 6 carbons, an allyl group, an aryl group, a furyl group, or a thienyl group. When there are two $R^{a1}$ groups in the molecule, they may be the same as or different from each other.

Examples of the alkyl groups include methyl, ethyl, propyl, and butyl groups, and the like; and the fluoroalkyl group is preferably the alkyl group above of which any of the hydrogen atoms are substituted with fluorine atoms.

$R^{a2}$ represents an alkyl group having 1 to 6 carbons, an alkenyl group having 2 to 6 carbons, an aromatic ring-containing group, an alkylcarbonyl group having 2 to 6 carbons, an alkoxycarbonyl group having 2 to 6 carbons, or an N-alkylcarbamoyl group having 2 to 6 carbon atoms. Examples of the alkyl groups include methyl, ethyl, propyl, and butyl groups, and the like; examples of the alkenyl groups include 1-propenyl, 2-propenyl, 2-methyl-1-propenyl, 2-methyl-2-propenyl, 1-butenyl, 2-butenyl, and 3-butenyl group, and the like; examples of the aromatic ring-containing groups include phenyl, benzyl, fluorobenzyl, methoxybenzyl, and phenoxyethyl groups, and the like. Examples of the alkylcarbonyl groups include ethylcarbonyl, propylcarbonyl, and butylcarbonyl groups, and the like; examples of the alkoxycarbonyl groups include ethoxycarbonyl, propoxycarbonyl, and butoxycarbonyl groups, and the like; and examples of the N-alkylcarbamoyl groups include ethylcarbamoyl, propylcarbamoyl, butylcarbamoyl, and pentylcarbamoyl groups, and the like.

$R^{a3}$ represents a linear or branched alkylene group, a linear or branched poly(alkyleneoxy) group, a linear or branched unsaturated hydrocarbon group, a carbonyl group or a carbonyl group-containing alkylene group, a carboxyl group-containing alkylene group, a carbamoyl group-containing alkylene group, or, a group shown below group. Examples of the alkylene groups include ethylene, propylene, and butylene groups; and examples of the poly(alkyleneoxy)groups include poly(ethyleneoxy) and poly(propyleneoxy) groups, and the like. Examples of the unsaturated hydrocarbon groups include propenylene, methylpropenylene, and butenylene groups, and the like.

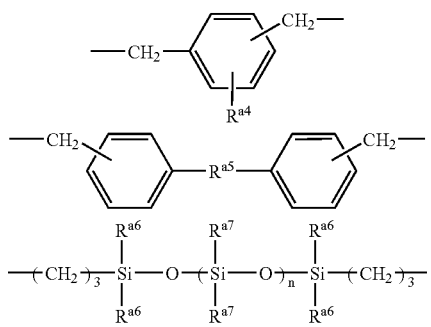

When $R^{a3}$ is one of the polyvalent group above, $R^{a4}$ represents a hydrogen atom, an alkyl group having 1 to 4 carbons, an alkoxy group having 1 to 4 carbons, a halogen atom, a nitro group, a cyano group, a mercapto group, a lower alkylcarboxyl group, a carboxyl group, or a carbamoyl group.

$R^{a5}$ represents an oxygen or sulfur atom, a methylene group, NH, SO, $SO_2$, $C(CF_3)_2$, or $C(CH_3)_2$.

$R^{a6}$ represents an alkyl group having 1 to 4 carbons or an aryl group; and n is an integer of 0 to 2,000. $R^{a7}$ represents an alkyl group having 1 to 4 carbons, an aryl group, or a monovalent group having the following structure. In the Formula below, $R^{a8}$ represents an alkyl group having 1 to 4 carbons or an aryl group; and m is an integer of 0 to 100.

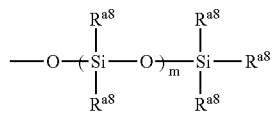

Examples of the compounds having three to four oxetane rings include the compounds represented by the following Formula (4).

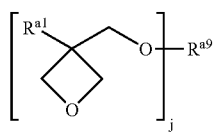

(4)

In Formula (4), $R^{a1}$ is the same as that in Formula (1) above. Examples of the polyvalent connected groups $R^{a9}$ include branched alkylene groups having 1 to 12 carbons such as those represented by the following Formulae A to C, branched poly(alkyleneoxy) groups such as those represented by the following Formula D, branched polysiloxy groups such as those represented by the following Formula E, and the like. j is 3 or 4.

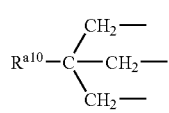

A

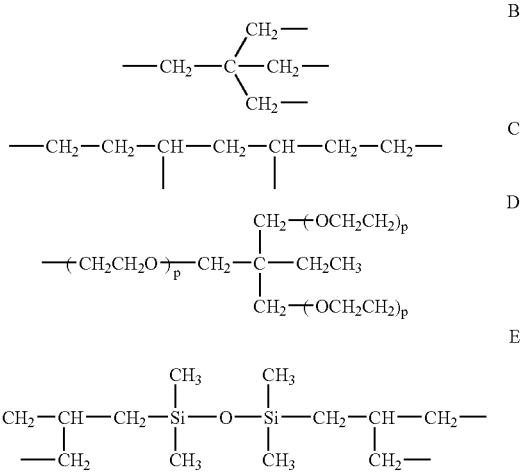

In Formula A above, $R^{a10}$ represents a methyl, ethyl, or propyl group. In Formula D above, p is an integer of 1 to 10.

Other examples of the oxetane compounds favorable for use in the invention include the compounds represented by the following Formula (5) having oxetane rings on the side chains.

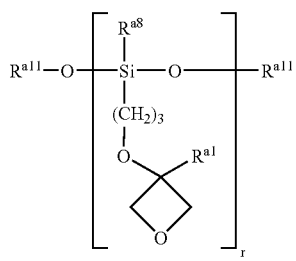

(5)

In Formula (5), $R^{a1}$ and $R^{a8}$ are the same as those described in the Formula above. $R^{a11}$ represents an alkyl group having 1 to 4 carbons such as methyl, ethyl, propyl, or butyl, or a trialkylsilyl group; and r is 1 to 4.

Among the oxetane compounds for use in the invention, examples of monofunctional oxetane compounds include 3-ethyl-3-hydroxymethyloxetane, 3-(meta)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenylether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl)ether, 2-ethylhexyl (3-ethyl-3-oxetanylmethyl)ether, ethyldiethylene glycol(3-ethyl-3-oxetanylmethyl)ether, dicyclopentadiene(3-ethyl-3-oxetanylmethyl)ether, dicyclopentenyloxyethyl(3-ethyl-3-oxetanylmethyl)ether, dicyclopentenyl(3-ethyl-3-oxetanylmethyl)ether, tetrahydrofurfuryl(3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3-ethyl-3-oxetanylmethyl)ether, 2-hydroxyethyl(3-ethyl-3-oxetanylmethyl)ether, 2-hydroxypropyl(3-ethyl-3- oxetanylmethyl)ether, butoxyethyl(3-ethyl-3-oxetanylmethyl)ether, pentachlorophenyl(3-ethyl-3-oxetanylmethyl)ether, pentabromophenyl(3-ethyl-3-oxetanylmethyl)ether, bornyl(3-ethyl-3-oxetanylmethyl) ether, and the like.

Examples of multifunctional oxetane compounds include 3,7-bis(3-oxetanyl)-5-oxa-nonane, 3,3'-[1,3-(2-methylenyl) propandiyl bis(oxymethylene)]bis-(3-ethyloxetane), 1,4-bis [(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecandiyldimethylene(3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ethers, caprolactone-modified dipentaerythritol pentakis(3-ethyl-3-oxetanylmethyl)ethers, ditrimethyrollpropane tetrakis(3-ethyl-3-oxetanylmethyl)ether, EO-modified bisphenol A bis (3-ethyl-3-oxetanylmethyl)ethers, PO-modified bisphenol A bis(3-ethyl-3-oxetanylmethyl)ethers, EO-modified hydrogenated bisphenol A bis(3-ethyl-3-oxetanylmethyl)ethers, PO-modified hydrogenated bisphenol A bis(3-ethyl-3-oxetanylmethyl)ethers, EO-modified bisphenol F(3-ethyl-3-oxetanylmethyl)ethers, and the like.

Examples of Vinylethers

In the invention, a vinylether group-containing compound may be contained, for further improvement of hardening degree. In such a case, the vinylether group-containing compound is preferably contained in an amount in the range of 1% by mass to 20% by mass in the ink composition, for control of the surface physical properties of hardened product and the solubility of ink composition.

Examples of the monofunctional vinylethers for use in the invention include methylvinylether, ethylvinylether, propylvinylether, n-butylvinylether, t-butylvinylether, 2-ethylhexylvinylether, n-nonylvinylether, laurylvinylether, cyclohexylvinylether, cyclohexylmethylvinylether, 4-methylcyclohexylmethylvinylether, benzylvinylether, dicyclopentenylvinylether, 2-dicyclopentenoxyethylvinylether, methoxyethylvinylether, ethoxyethylvinylether, butoxyethylvinylether, methoxyethoxyethylvinylether, ethoxyethoxyethylvinylether, methoxypolyethylene glycol vinylether, tetrahydrofurfurylvinylether, 2-hydroxyethylvinylether, 2-hydroxypropylvinylether, 4-hydroxybutylvinylether, 4-hydroxymethylcyclohexylmethylvinylether, diethylene glycol monovinylether, polyethylene glycol vinylether, chloroethylvinylether, chlorobutylvinylether, chloroethoxyethylvinylether, phenylethylvinylether, phenoxypolyethylene glycol vinylether and the like.

Examples of the multifunctional vinylethers include divinylethers such as ethylene glycol divinylether, diethylene glycol divinylether, polyethylene glycol divinylether, propylene glycol divinylether, butylene glycol divinylether, hexanediol divinylether, bisphenol A alkylene oxide divinylethers, and bisphenol F alkylene oxide divinylethers; multifunctional vinylethers such as trimethylolethane trivinylether, trimethylolpropane trivinylether, ditrimethyrollpropane tetravinylether, glycerol trivinylether, pentaerythritol tetravinylether, dipentaerythritol pentavinylether, dipentaerythritol hexavinylether, ethylene oxide adducts of trimethylolpropane trivinylether, propylene oxide adducts of trimethylolpropane trivinylether, ethylene oxide adducts of ditrimethyrollpropane tetravinylether, propylene oxide adducts of ditrimethyrollpropane tetravinylether, ethylene oxide adducts of pentaerythritol tetravinylether, propylene oxide adducts of pentaerythritol tetravinylether, ethylene oxide adducts of dipentaerythritol hexavinylether, and propylene oxide adducts of dipentaerythritol hexavinylether; and the like.

Photocationic Polymerization Initiator

The ink composition of the invention contains a photocationic polymerization initiator. The photocationic polymerization initiator is a compound that generates acid and initiates cationic polymerization by irradiation of an activated or radiation ray, and any one of known compounds and the mixtures thereof properly selected may be used.

The following photocationic polymerization initiators may be used alone as a single initiator or as a mixture of two or more initiators. The content of the photocationic polymerization initiator in the ink composition is preferably in the range of 0.1 to 20% by mass and more preferably 0.5 to 10% by mass. A photocationic polymerization initiator content of 0.1% by mass or less may lead to reduction in the amount of acid generated and deterioration in hardening efficiency, while a photocationic polymerization initiator content of 20% by mass or more may to problems such as brittleness of the hardened product and generation of acid by the residual initiator.

Examples of the photocationic polymerization initiators according to the invention include diazonium salts, phosphonium salts, sulfonium salts, iodonium salts, imide sulfonates, oxime sulfonates, diazo disulfones, disulfones, and o-nitrobenzyl sulfonates.

These photocationic polymerization initiators or the compounds having a group or compound equivalent in action introduced on the polymer main or side chain, for example, the compounds described in U.S. Pat. No. 3,849,137, Germany Patent 3914407, JP-A Nos. 63-26653, 55-164824, 62-69263, 63-146038, 63-163452, 62-153853, and 63-146029, and others may be used. The compounds that generate acid by irradiation of light described in U.S. Pat. No. 3,779,778, EP Patent No. 126,712, and others may also be used.

Favorable photochemical acid generators for use in the invention include the compounds represented by the following Formulae (b1), (b2), and (b3).

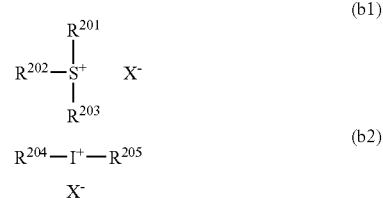

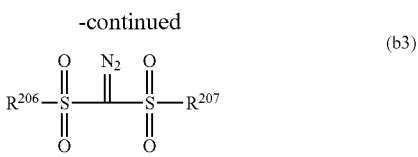

In Formula (b1), $R^{201}$, $R^{202}$ and $R^{203}$ each independently represent an organic group.

$X^-$ represents a non-nucleophilic anion, and typical examples thereof include sulfonate anions, carboxylate anions, bis(alkylsulfonyl)amide anions, tris(alkylsulfonyl) anions, $BF_4^-$, $PF_6^-$, $SbF_6^-$, the groups shown below, and the like; preferable are $BF_4^-$, $PF_6^-$, $SbF_6^-$, the groups shown below; and more preferable are $BF_4^-$, $PF_6^-$, $SbF_6^-$.

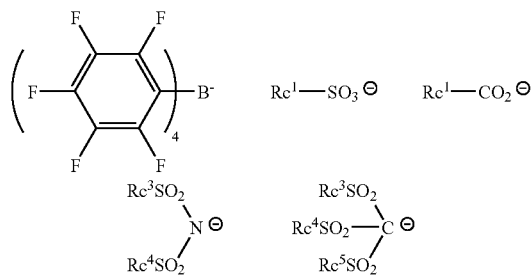

$Rc^1$ represents an organic group.

Examples of the organic group $Rc^1$ include those having 1 to 30 carbons, preferably alkyl groups, cycloalkyl groups, aryl groups, and groups having multiple of these groups that are connected to each other via a connecting group such as single bond, —O—, —$CO_2$—, —S—, —$SO_3$—, or —$SO_2N$ ($Rd^1$)—. In addition, these organic groups may have a substituent group additionally.

$Rd^1$ represents a hydrogen atom or an alkyl group.

$Rc^3$, $Rc^4$, and $Rc^5$ each independently represent an organic group.

Favorable examples of the organic group of $Rc^3$, $Rc^4$, or $Rc^5$ include those favorable as $Rc^1$, and most preferable are perfluoroalkyl groups having 1 to 4 carbons.

$Rc^3$ and $Rc^4$ may bind to each other, forming a ring.

The groups formed by the binding between $Rc^3$ and $Rc^4$ include alkylene and arylene groups, and preferable are perfluoroalkylene groups having 2 to 4 carbons.

The organic group of $Rc^1$ or $Rc^3$ to $Rc^5$ is most preferably an alkyl group substituted with a fluorine atom or a fluoroalkyl group or a phenyl group substituted with a fluorine atom or a fluoroalkyl group. Presence of a fluorine atom or a fluoroalkyl group is effective in improving the acidity of the acid generated by photoirradiation and the sensitivity of the ink composition.

The number of carbons in the organic group of $R^{201}$, $R^{202}$ or $R^{203}$ is generally 1 to 30 and preferably 1 to 20.

Two of $R^{201}$ to $R^{203}$ groups may bind to each other, forming a ring structure, and the ring may contain an oxygen or sulfur atom, an ester or amide bond, or a carbonyl group. Examples of the groups formed by binding of two of $R^{201}$ to $R^{203}$ groups include alkylene groups (e.g., butylene and pentylene groups).

Typical examples of the organic group of $R^{201}$, $R^{202}$ or $R^{203}$ include corresponding groups in the compounds (b1-1), (b1-2), or (b1-3) described below.

It may be a compound that has two or more of the structures represented by Formula (b1). For example, it may be a compound having a structure wherein at least one of $R^{201}$ to $R^{203}$ of the compound represented by Formula (b1) is bound, directly or via a connecting group, to at least one of $R^{201}$ to $R^{203}$ of another compound represented by Formula (b1).

Still more preferable components (b1) include the compounds (b1-1), (b1-2), and (b1-3) described below.

The compound (b1-1) is an arylsulfonium compound having an aryl group as at least one of $R^{201}$ to $R^{203}$ in Formula (b1) above i.e., a compound having an arylsulfonium cation.

The arylsulfonium compound may have aryl groups as all of $R^{201}$ to $R^{203}$, or aryl groups as part of $R^{201}$ to $R^{203}$ and alkyl or cycloalkyl groups as the other part thereof.

Examples of the arylsulfonium compounds include triarylsulfonium compounds, diarylalkylsulfonium compounds, aryldialkylsulfonium compounds, diarylcycloalkylsulfonium compounds, aryldicycloalkylsulfonium compounds, and the like.

The aryl group of the arylsulfonium compound is preferably, for example, an aryl group such as phenyl or naphthyl or a heteroaryl group such as indole or pyrrole residue, and more preferably a phenyl group or an indole residue. When the arylsulfonium compound has two or more aryl groups, the two or more aryl groups may be the same as or different from each other.

The alkyl group the arylsulfonium compound has as needed is preferably a straight-chain or branched alkyl group having 1 to 15 carbons, and examples thereof include methyl, ethyl, propyl, n-butyl, sec-butyl, and t-butyl groups, and the like.

The cycloalkyl group the arylsulfonium compound has as needed is preferably a cycloalkyl group having 3 to 15 carbons, and examples thereof include cyclopropyl, cyclobutyl, and cyclohexyl groups, and the like.

The aryl, alkyl, or cycloalkyl groups of $R^{201}$ to $R^{203}$ may have an alkyl group (for example, that having 1 to 15 carbon atoms), a cycloalkyl group (for example, that having 3 to 15 carbon atoms), an aryl group (for example, that having 6 to 14 carbon atoms), an alkoxy group (for example, that having 1 to 15 carbon atoms), a halogen atom, a hydroxyl group, or a phenylthio group as the substituent group. Preferable examples of the substituent groups are straight-chain or branched alkyl groups having 1 to 12 carbons, cycloalkyl groups having 3 to 12 carbons, and straight-chain, branched or cyclic alkoxy groups having 1 to 12 carbons; and most preferable are alkyl groups having 1 to 4 carbons and alkoxy groups having 1 to 4 carbons. The substituent group may be bound to any one of the three groups $R^{201}$ to $R^{203}$ or to all three substituent groups. When one of $R^{201}$ to $R^{203}$ is an aryl group, the substituent group is preferably bound to the p-position carbon of the aryl group.

Hereinafter, compound (b1-2) will be described.

The compound (b1-2) is a compound represented by Formula (b1) wherein $R^{201}$ to $R^{203}$ in Formula (b1) each independently represent an organic group containing no aromatic ring. The aromatic rings include heteroatom-containing aromatic rings.

The organic groups containing no aromatic ring $R^{201}$ to $R^{203}$ are groups generally having 1 to 30 carbon atoms and preferably having 1 to 20 carbon atoms.

$R^{201}$ to $R^{203}$ each independently, preferably represent an alkyl, cycloalkyl, allyl, or vinyl group, more preferably a straight-chain, branched or cyclic 2-oxoalkyl group or an alkoxycarbonylmethyl group, and particularly preferably a straight-chain or branched 2-oxoalkyl group.

The alkyl group of $R^{201}$ to $R^{203}$ may be a straight-chain or branched group, preferably a straight-chain or branched alkyl group having 1 to 10 carbons (e.g., methyl, ethyl, propyl, butyl, or pentyl), and more preferably a straight-chain or branched 2-oxoalkyl group or an alkoxycarbonylmethyl group.

The cycloalkyl group of $R^{201}$ to $R^{203}$ is preferably, for example, a cycloalkyl group having 3 to 10 carbons (cyclopentyl, cyclohexyl, or norbornyl), and more preferably a cyclic 2-oxoalkyl group.

The straight-chain, branched, or cyclic 2-oxoalkyl group of $R^{201}$ to $R^{203}$ is preferably, for example, one of the alkyl groups above or a cycloalkyl group having >C=O at the 2-position.

The alkoxy group in the alkoxycarbonylmethyl group of $R^{201}$ to $R^{203}$ is preferably, for example, an alkoxy group having 1 to 5 carbons (methoxy, ethoxy, propoxy, butoxy, or pentoxy).

Each of $R^{201}$ to $R^{203}$ groups may be substituted additionally with a halogen atom, an alkoxy group (for example, that having 1 to 5 carbon atoms), a hydroxyl group, a cyano group, or a nitro group.

The compound (b1-3) is a compound represented by the following Formula (b1-3), i.e., a compound having a phenacylsulfonium salt structure.

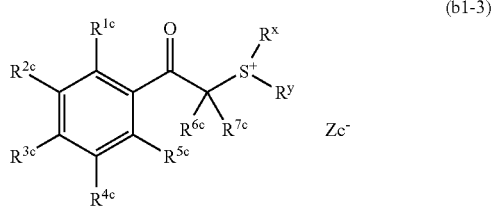

(b1-3)

In Formula (b1-3), $R^{1c}$ to $R^{5c}$ each independently represent a hydrogen atom, an alkyl group, a cycloalkyl group, an alkoxy group, or a halogen atom.

$R^{6c}$ and $R^{7c}$ each independently represent a hydrogen atom, an alkyl group or a cycloalkyl group.

$R^x$ and $R^y$ each independently represent an alkyl, cycloalkyl, allyl, or vinyl group.

Any two or more groups of $R^{1c}$ to $R^{5c}$, $R^{6c}$ and $R^{7c}$, and $R^x$ and $R^y$ may bind to each other, forming a ring structure respectively.

$Zc^-$ represents a non-nucleophilic anion, and examples thereof include the non-nucleophilic anions $X^-$ in Formula (b1).

The alkyl group in $R^{1c}$ to $R^{7c}$ may be a straight-chain or branched group, and examples thereof include straight-chain and branched alkyl groups having 1 to 20 carbon atoms, preferably having 1 to 12 carbon atoms, (e.g., methyl, ethyl, straight-chain or branched propyl, straight-chain or branched butyl, and straight-chain or branched pentyl).

The cycloalkyl group of $R^{1c}$ to $R^{7c}$ is preferably, for example, a cycloalkyl group having 3 to 8 carbons (e.g., cyclopentyl or cyclohexyl).

The alkoxy group of $R^{1c}$ to $R^{5c}$ may be a straight-chain, branched, or cyclic group, and examples thereof include alkoxy groups having 1 to 10 carbons, preferably, straight-chain and branched alkoxy groups having 1 to 5 carbons (e.g., methoxy, ethoxy, straight-chain or branched propoxy, straight-chain or branched butoxy, and straight-chain or branched pentoxy groups), and cyclic alkoxy groups having 3 to 8 carbons (e.g., cyclopentyloxy and cyclohexyloxy groups).

The group formed by binding of any two or more groups of $R^{1c}$ to $R^{5c}$, $R^{6c}$ and $R^{7c}$, or $R^x$ and $R^y$ is, for example, a butylene or pentylene group, or the like. The ring structure may contain an oxygen or sulfur atom or an ester or amide bond.

Any one group of $R^{1c}$ to $R^{5c}$ is preferably a straight-chain or branched alkyl group, a cycloalkyl group, or a straight-chain, branched, or cyclic alkoxy group; and more preferably, the total of the number of carbons of $R^{1c}$ to $R^{5c}$ is 2 to 15. In this manner, it is possible to increase solvent solubility and prevent generation of particles during storage particle.

Examples of the alkyl or cycloalkyl groups of $R^x$ or $R^y$ include the alkyl and cycloalkyl groups of $R^{1c}$ to $R^{7c}$.

Each of $R^x$ and $R^y$ is preferably a 2-oxoalkyl or alkoxycarbonylmethyl group.

Examples of the 2-oxoalkyl groups include the groups having >C=O at the 2-position of the alkyl or cycloalkyl group of $R^{1c}$ to $R^{5c}$.

The alkoxy groups in alkoxycarbonylmethyl group include, for example, the alkoxy groups for $R^{1c}$ to $R^{5c}$.

Each of $R^x$ and $R^y$ is preferably an alkyl or cycloalkyl group having 4 or more carbon atoms, more preferably those having 6 or more carbon atoms, and still more preferably an alkyl or cycloalkyl group having 8 or more carbon atoms.

In Formulae (b2) and (b3), $R^{204}$ to $R^{207}$ each independently represent an aryl, alkyl, or cycloalkyl group. $X^-$ represents a non-nucleophilic anion, and examples thereof include the anions similar to the non-nucleophilic anions $X^-$ in Formula (b1).

The aryl group of $R^{204}$ to $R^{207}$ is preferably a phenyl or naphthyl group and more preferably a phenyl group.

The alkyl group of $R^{204}$ to $R^{207}$ may be a straight-chain or branched group, and is preferably, for example, a straight-chain or branched alkyl group having 1 to 10 carbons (e.g., methyl, ethyl, propyl, butyl, or pentyl group). The cycloalkyl group of $R^{204}$ to $R^{207}$ is preferably, for example, a cycloalkyl group having 3 to 10 carbons (cyclopentyl, cyclohexyl, or norbornyl group).

Examples of the substituent groups the $R^{204}$ to $R^{207}$ may have include alkyl groups (e.g., those having 1 to 15 carbon atoms), cycloalkyl groups (e.g., those having 3 to 15 carbon atoms), aryl groups (e.g., those having 6 to 15 carbon atoms), alkoxy groups (e.g., those having 1 to 15 carbon atoms), halogen atoms, a hydroxyl group, a phenylthio group, and the like.

Other examples of the photocationic polymerization initiators that may be used include the compounds represented by the following Formulae (b4), (b5), and (b6).

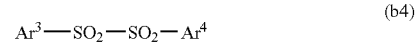

(b4)

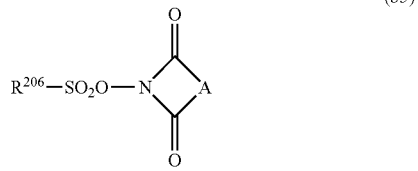

(b5)

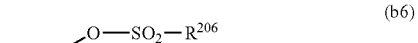

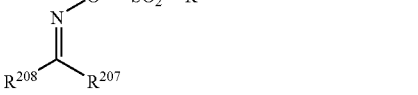

(b6)

In Formulae (b4) to (b6), $Ar^3$ and $Ar^4$ each independently represent an aryl group.

$R^{206}$, $R^{207}$ and $R^{208}$ each independently represent an alkyl, cycloalkyl, or aryl group.

A represents an alkylene, alkenylene, or arylene group.

Among the photocationic polymerization initiators above, preferable are, for example, the compounds represented by Formulae (b1) to (b3).

Particularly preferable photocationic polymerization initiators for use in the invention are listed below.

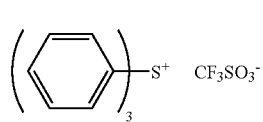 (b-1)

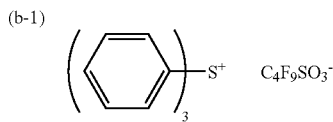 (b-2)

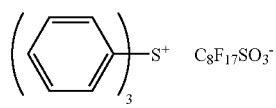 (b-3)

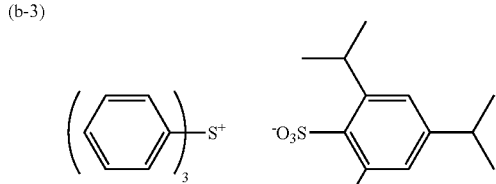 (b-4)

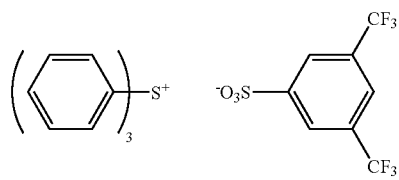 (b-5)

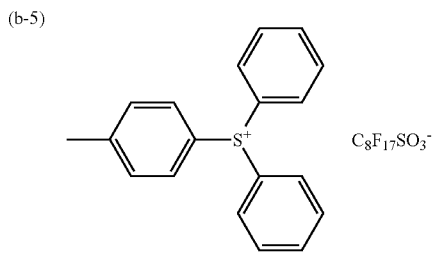 (b-6)

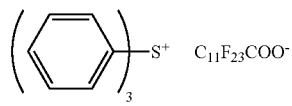 (b-7)

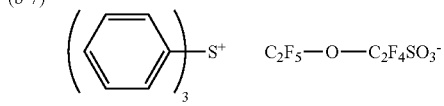 (b-8)

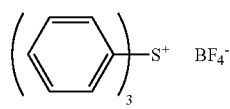 (b-9)

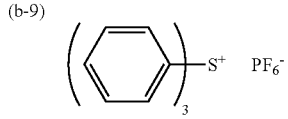 (b-10)

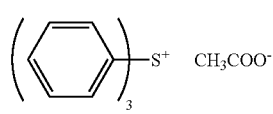 (b-11)

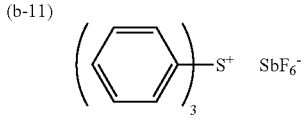 (b-12)

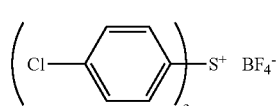 (b-13)

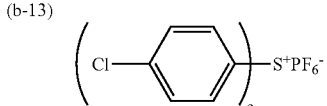 (b-14)

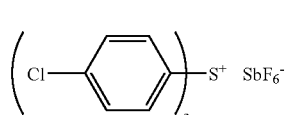 (b-15)

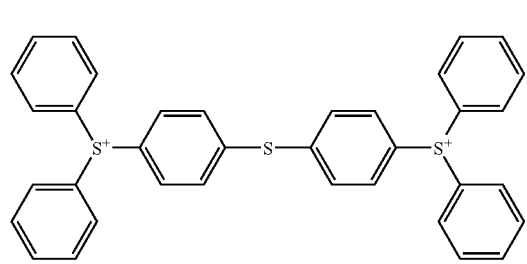 (b-16)

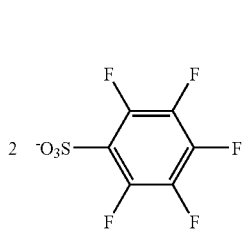

-continued
(b-17)
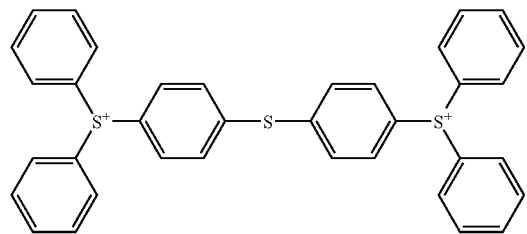
(b-18)
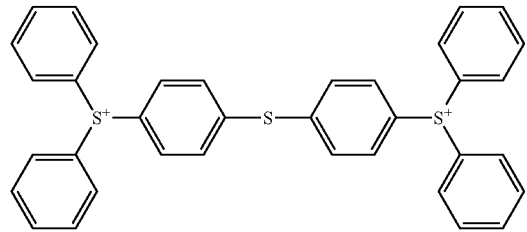
(b-19)
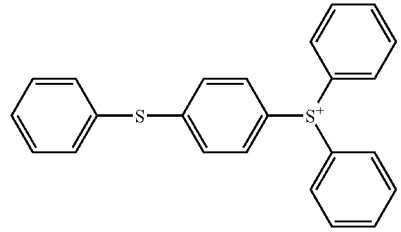 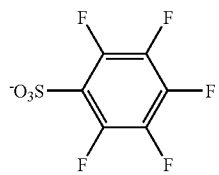
(b-20) (b-21)
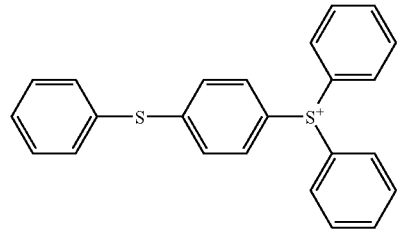 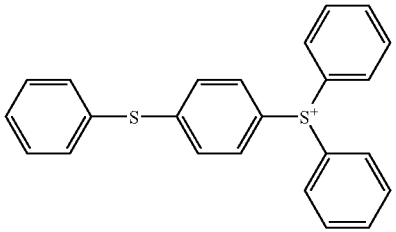
(b-22) (b-23)
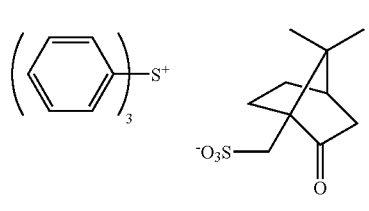 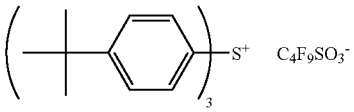
(b-24) (b-25)
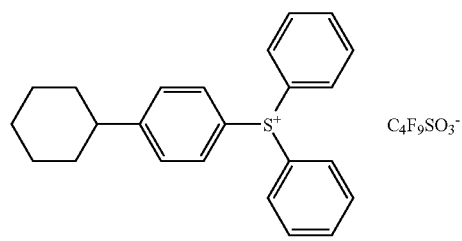 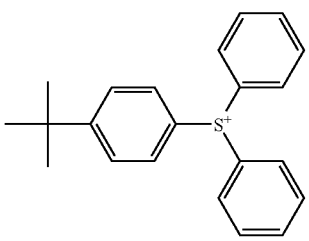
(b-26) (b-27)
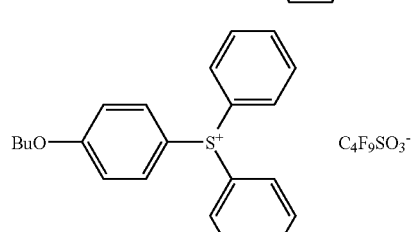 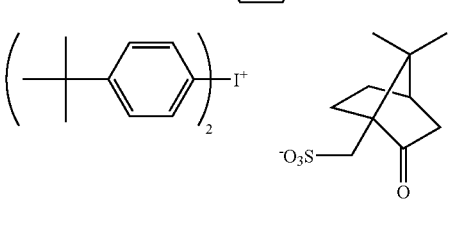

-continued
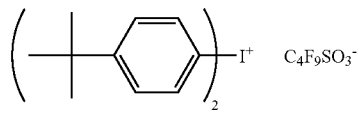 (b-28)
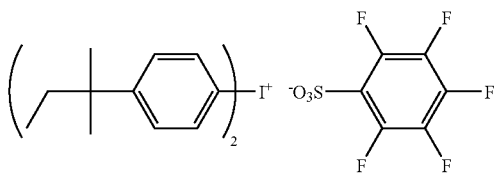 (b-29)
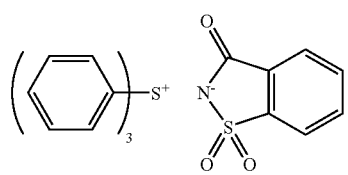 
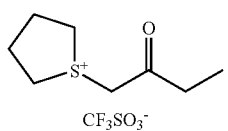 (b-30)
CF₃SO₃⁻
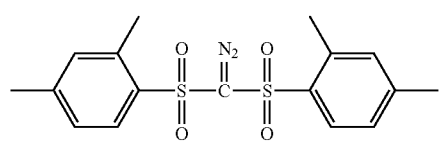 (b-38)
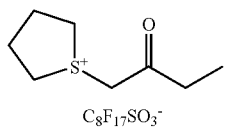 (b-32)
C₈F₁₇SO₃⁻
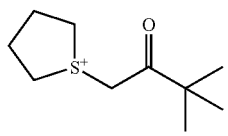 (b-34)
C₄F₉SO₃⁻
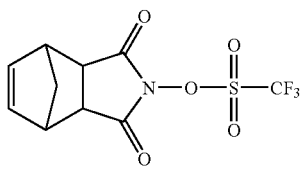 (b-36)
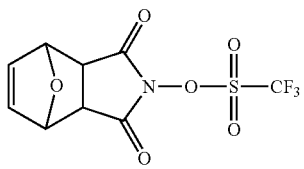 (b-38)
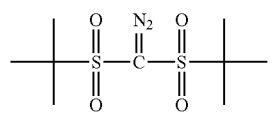 (b-40)
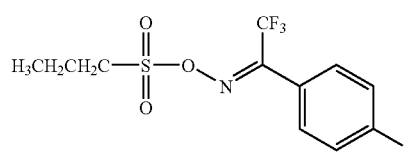 (b-42)
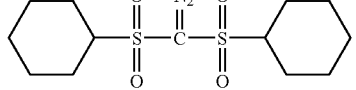 
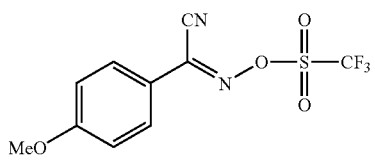 (b-44)

-continued
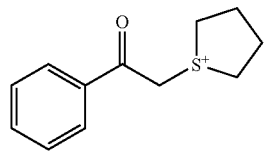
(b-45)
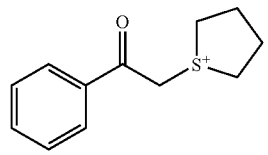
(b-46)
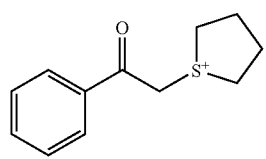
(b-47)
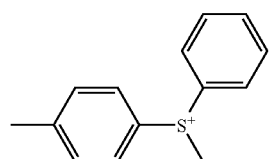
(b-48)
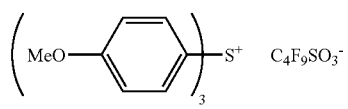
(b-49)
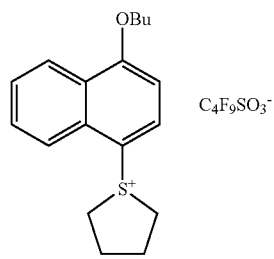
(b-50)
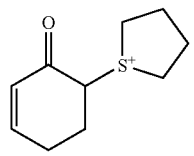
(b-51)
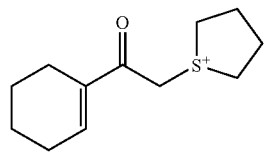
(b-52)
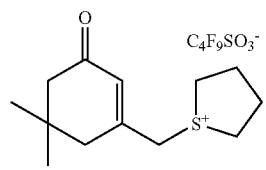
(b-53)
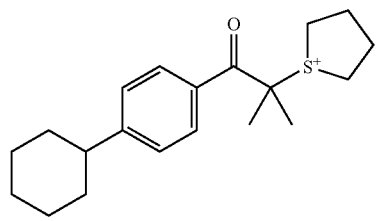
(b-54)
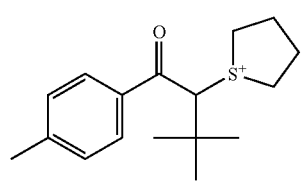
(b-55)
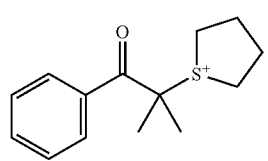
(b-56)

-continued
(b-57)
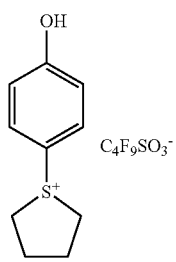
(b-58)
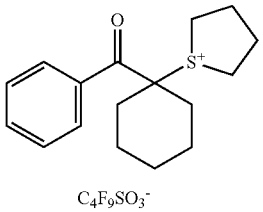
(b-59)
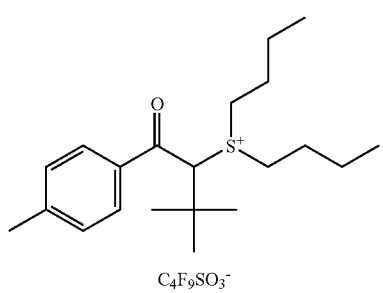
(b-60)
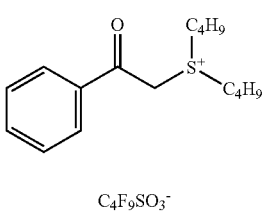
(b-61)
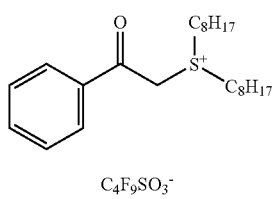
(b-62)
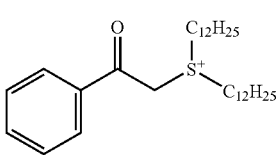
(b-63)
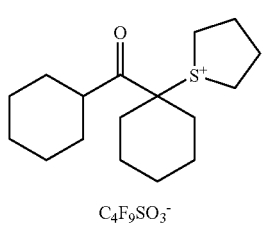
(b-64)
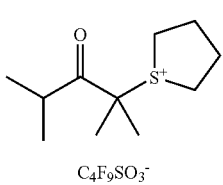
(b-65)
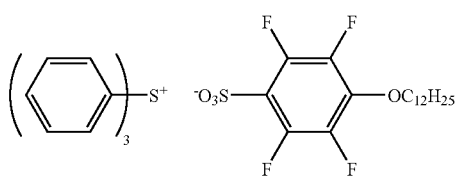
(b-66)
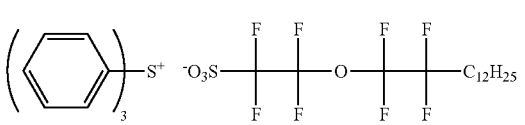
(b-67)
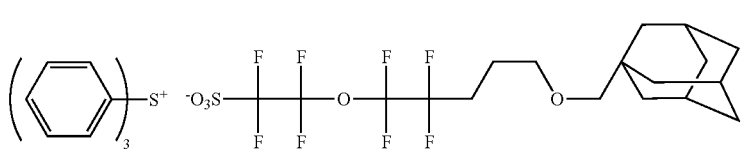
(b-68)
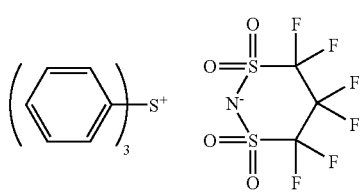
(b-69)
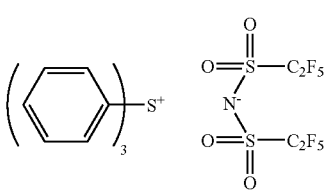

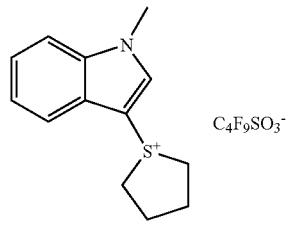 (b-70)

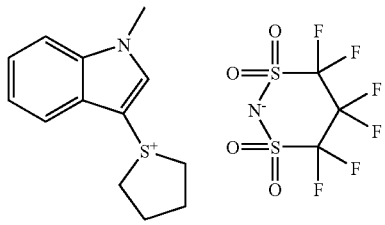 (b-71)

In addition, the oxazole and s-triazine derivatives described in JP-A No. 2002-122994, paragraph Nos. [0029] to [0030] are also used favorably. The disclosure is incorporated by reference herein.

The onium salt and sulfonate compounds exemplified in JP-A No. 2002-122994, paragraph Nos. [0037] to [0063] are also used favorably in the invention. The disclosure is incorporated by reference herein.

High-Energy Ray

The high-energy rays for use in polymerization of the ink composition of the invention include α-ray, γ-ray, X-ray, ultraviolet ray, visible ray, electron beam, and the like. Among them, use of ultraviolet or visible ray is preferable, and use of ultraviolet ray is more preferable, from the points of cost and stability.

A known ultraviolet ray lamp such as low- or high-pressure mercury lamp, short arc discharge lamp, or ultraviolet ray-emitting diode may be used as the light source for generating ultraviolet ray; and a high-pressure discharge lamp such as high-pressure mercury lamp or metal halide lamp, or a short arc discharge lamp such as xenon lamp is used preferably, depending on the light intensity and the wavelength suitable for the initiator. An ultraviolet ray-emitting diode is also used favorably, from the viewpoint of energy conservation.

Polymerization Inhibitor

In the invention, it is preferable to use a polymerization inhibitor that inhibits polymerization other than cationic polymerization additionally, for advancing the polymerization by the photocationic polymerization initiator more effectively. Suitable polymerization inhibitor is a compound selected from the group consisting of phenol hydroxyl group-containing compounds, quinones, N-oxide compounds, piperidin-1-oxyl free radical compounds, pyrrolidin-1-oxyl free radical compounds, N-nitrosophenyl hydroxylamines, and cation dyes. Preferable examples of the polymerization inhibitors include p-methoxyphenol, di-t-butyl-p-cresol, pyrogallol, resorcinol, catechol, t-butylcatechol, hydroquinone, benzoquinone, 4,4-thiobis(3-methyl-6-t-butylphenol), 2,2'-methylene-bis(4-methyl-6-t-butylphenol), 2,2,6,6-tetramethylpiperidine and the derivatives thereof, di-t-butyl nitroxide, 2,2,6,6-tetramethylpiperidine-N-oxide and the derivatives thereof, piperidin-1-oxyl free radical, 2,2,6,6-tetramethylpiperidin-1-oxyl free radical, 4-oxo-2,2,6,6-tetramethylpiperidin-1-oxyl free radical, 4-hydroxy-2,2,6,6-tetramethylpiperidin-1-oxyl free radical, 4-acetamido-2,2,6,6-tetramethylpiperidin-1-oxyl free radical, 4-maleimido-2,2,6,6-tetramethylpiperidin-1-oxyl free radical, 4-phosphonoxy-2,2,6,6-tetramethylpiperidin-1-oxyl free radical, 3-carboxy-2,2,5,5-tetramethylpyrrolidin-1-oxyl free radical, N-nitrosophenylhydroxylamine cerous salt, N-nitrosophenylhydroxylamine aluminum salt, crystal violet, methyl violet, ethyl violet, Victoria Pure Blue BOH, and the like. The amount of the polymerization inhibitor added is preferably, approximately 0.01% by mass to approximately 5% by mass in the ink composition.

Colorant

A colorant may be added to the ink composition of the invention. It is possible to form a visible image when a colorant is added; and the colorant in the printed material after curing by high-energy ray irradiation is covered with a resin, and thus, is superior in water and solvent resistances.

The colorant for use is not particularly limited, and may be selected properly from various known colorants (pigments and dyes) according to applications. For example, use of a pigment is preferable for forming an image superior in weather resistance. On the contrary, use of a dye is preferable, for forming an image superior in transparency on a transparent film. Either a water- or oil-soluble dye may be used as the dye, if it is soluble in the polymerizable compound, but use of an oil-soluble dye is preferable, because a dye less compatible with the polymerizable compound leads to deterioration in ink stability. That is, it is preferable to use a pigment or an oil-soluble dye as the colorant. Such an ink is superior in water resistance, because it does not contain a water-soluble colorant.

The content of the colorant in the ink composition is preferably 0.5 to 20% by mass, more preferably 1 to 15% by mass, and still more preferably 5 to 15% by mass.

Hereinafter, the pigments favorably used in the invention will be described.

Pigment

The pigment is not particularly limited, and examples thereof include all common commercially-available organic and inorganic pigments, dispersions of the pigments dispersed in a dispersion medium such as insoluble resin, pigments surface-grafted with a resin, and the like. Alternatively, for example, resin particles colored with a dye may also be used.

Such pigments include the pigments described, for example, in Seijiro Itoh Ed., "Dictionary of Pigments" (2000), W. Herbst K. Hunger, Industrial Organic Pigments", and JP-A Nos. 2002-12607, 2002-188025, 2003-26978, and 2003-342503.

Typical examples of the organic and inorganic pigments for use in the invention include the followings. Yellow pigments including monoazo pigments such as C.I. Pigment Yellow 1 (Fast Yellow G, etc.) and C.I. Pigment Yellow 74; disazo pigments such as C.I. Pigment Yellow 12 (Disazo Yellow AAA, etc.) and C.I. Pigment Yellow 17; non-benzidine azo pigments such as C.I. Pigment Yellow 180; azolake pigments such as C.I. Pigment Yellow 100 (tartrazine yellow lake, etc.); condensation azo pigments such as C.I. Pigment Yellow 95(Condensation Azo Yellow GR, etc.); acidic-dye lake pigments such as C.I. Pigment Yellow 115 (quinoline yellow lake, etc.); basic-dye lake pigments such as C.I. Pigment Yellow 18 (thioflavin lake, etc.); anthraquinone pigments such as fravantrone yellow (Y-24); isoindolinone pigments such as Isoindolinone Yellow 3RLT (Y-110); quinophtharone pigments such as quinophtharone yellow (Y-138); isoindoline pigments such as isoindoline yellow (Y-139); nitroso pigments such as C.I. Pigment Yellow 153 (nickel nitroso yellow, etc.); metal complex salt azomethine pigments such as C.I. Pigment Yellow 117 (copper azomethine yellow, etc.); and the like.

Red or magenta pigments including monoazo pigments such as C.I. Pigment Red 3 (toluidine red, etc.); disazo pigments such as C.I. Pigment Red 38 (Pyrazolone Red B, etc.); azolake pigments such as C.I. Pigment Red 53:1 (Lake Red C, etc.) and C.I. Pigment Red 57:1 (Brilliant Carmine 6B); condensation azo pigments such as C.I. Pigment Red 144 (Condensation Azo Red BR, etc.); acidic-dye lake pigments such as C.I. Pigment Red 174 (Phloxine B Lake, etc.); basic dye lake pigments such as C.I. Pigment Red 81 (Rhodamine 6G' Lake, etc.); anthraquinone pigments such as C.I. Pigment Red 177 (dianthraquinolyl red, etc.); thioindigo pigments such as C.I. Pigment Red 88 (Thioindigo Bordeaux, etc.); perynone pigments such as C.I. Pigment Red 194 (perynone red, etc.); perylene pigments such as C.I. Pigment Red 149 (perylene scarlet, etc.); quinacridone pigments such as C.I. Pigment Violet 19 (unsubstituted quinacridone) and C.I. Pigment Red 122 (quinacridone magenta, etc.); isoindolinone pigments such as C.I. Pigment Red 180 (Isoindolinone Red 2BLT, etc.); alizarin lake pigments such as C.I. Pigment Red 83 (madder lake, etc.); and the like.

Blue or cyan pigments including disazo pigments such as C.I. Pigment Blue 25 (dianisidine blue, etc.); phthalocyanine pigments such as C.I. Pigment Blue 15 (phthalocyanine blue, etc.); acidic-dye lake pigments such as C.I. Pigment Blue 24 (peacock blue lake, etc.); basic dye lake pigments such as C.I. Pigment Blue 1 (Victria Blue BO lake, etc.); anthraquinone pigments such as C.I. Pigment Blue 60 (indanthron blue, etc.); alkali blue pigments such as C.I. Pigment Blue 18 (Alkali Blue V-5:1); and the like.

Green pigments including phthalocyanine pigments such as C.I. Pigment Green 7 (phthalocyanine green) and C.I. Pigment Green 36 (phthalocyanine green); azo metal complex pigments such as C.I. Pigment Green 8 (nitroso green); and the like.

Orange pigments including isoindoline pigments such as C.I. Pigment Orange 66 (isoindoline orange); anthraquinone pigments such as C.I. Pigment Orange 51 (dichloropyranthron orange); and the like.

Black pigments including carbon black, titanium black, aniline black, and the like.

Typical examples of white pigments include basic lead carbonate ($2PbCO_3Pb(OH)_2$, so-called silver white), zinc oxide (ZnO, so-called zinc white), titanium oxide ($TiO_2$, so-called titanium white), strontium titanate ($SrTiO_3$, so-called titanium strontium white), and the like.

Titanium oxide has a lower density and a higher refractive index than other white pigments, is more stable chemically or physically, and thus, has a greater masking and coloring potential as a pigment, and is excellent in resistance to acid or alkali and other environmental factors. Thus, use of titanium oxide as the white pigment is preferable. Other white pigments (including white pigments other than those described above) may be used as needed.

For dispersing the pigment, any one of dispersing machines, such as ball mill, sand mill, attriter, roll mill, jet mill, homogenizer, paint shaker, kneader, agitator, Henschel mixer, colloid mill, ultrasonic wave homogenizer, pearl mill, and wet jet mill, may be used.

It is also possible to add a dispersant during dispersion of the pigment. Examples of the dispersants include hydroxyl group-containing carboxylic acid esters, salts of a long-chain polyamino amide with a high-molecular weight acid ester, high-molecular weight polycarboxylic acid salts, high-molecular weight unsaturated acid esters, copolymers, modified polyacrylates, aliphatic polyvalent carboxylic acids, naphthalenesulfonic acid/formalin condensates, polyoxyethylene alkyl phosphoric esters, pigment derivatives, and the like. Use of a commercially available polymer dispersant, for example a Solsperse series product of Zeneca, is also preferable.

It is also possible to use a synergist suitable for the pigment used as the dispersion aid. These dispersant and dispersion aid are preferably added in an amount of 1 to 50 parts by weight with respect to 100 parts by weight of the pigment.

In the ink composition, a solvent may be added as the dispersion medium for various components such as pigment, or the polymerizable compound above, which is a low-molecular weight component, may be used without solvent, but the ink composition of the invention preferably contains no solvent, because the composition is a radiation-hardening ink that is hardened after applied on a recording medium. It is because the solvent remaining in the hardened ink image leads to deterioration in solvent resistance and causes a problem of VOC (Volatile Organic Compound). Thus, selection of a cationically polymerizable compound, in particular a cationic-polymerization monomer lowest in viscosity, as the dispersion medium is preferable, for improvement in dispersibility and handling efficiency of the ink composition.

The average diameter of the pigment particles is preferably 0.08 to 0.5 µm, and the pigment, the dispersant, and dispersion medium are selected and the dispersion and filtration conditions are determined in such a manner that the maximum diameter becomes preferably 5 µm or less and more preferably 2 µm or less. Control of particle diameter enables prevention of clogging in head nozzles and preservation of the storage stability, transparency and hardening efficiency of ink.

Dye

Hereinafter, the colorants favorably used in the invention will be described.

A dye is used as it is properly selected from known compounds (dyes). Typical examples of favorable dyes include the dyes described in JP-A No. 2002-114930, paragraph Nos., [0023] to [0089]. The disclosure is incorporated by reference herein.

The yellow dye is, for example, an aryl or heteryl azo dye having a phenol, naphthol, aniline, pyrazolone, pyridone, or open-chain active methylene compound as the coupling component; and examples thereof include azomethine dyes having an open-chain active methylene compound as the coupling component; methine dyes such as benzylidene dyes and monomethine oxonol dyes; quinone dyes such as naphthoquinone dyes and anthraquinone dyes; as well as quinophtharone dyes, nitro and nitroso dyes, acridine dyes, acridinone dyes, and the like.

Examples of the magenta dyes include aryl or heteryl azo dyes having a phenol, naphthol, aniline, pyrazolone, pyridone, pyrazolotriazole, a closed-chain active methylene compound (e.g., dimedone, barbituric acid, or 4-hydroxycoumarin derivative), or an electron-rich heterocyclic ring (e.g., pyrrole, imidazole, thiophene, or thiazole derivative) as the coupling component, including azomethine dyes, for example, having a pyrazolone or pyrazolotriazole group as the coupling component; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinone, anthraquinone, and anthrapyridone dyes; fused polycyclic dyes such as dioxazine dyes; and the like.

Examples of the cyan dyes include azomethine dyes such as indoaniline and indophenol dye; polymethine dyes such as cyanine, oxonol, and merocyanine dye; carbonium dyes such as diphenylmethane, triphenylmethane, and xanthene dyes; phthalocyanine and anthraquinone dyes; aryl or heteryl azo dyes, for example, having a phenol, naphthol, aniline, pyrrolopyrimidinone or pyrrolotriazinone derivative as the coupling component; and indigo and thioindigo dyes.

The dyes above may develop a color, yellow, magenta, or cyan, only when part of the chromophores are dissociated; and in such a case, the counter anion may be an inorganic cation such as an alkali metal, ammonium, an organic cation such as pyridinium or quaternary ammonium salt, or a cationic polymer having such a partial structure.

The dye for use the invention is preferably soluble in oil. Specifically, the dye preferably has a water solubility (weight of the colorant dissolved in 100 g of water) of 1 g or less at 25° C., preferably 0.5 g or less, and more preferably 0.1 g or less. Accordingly, so-called oil-soluble dyes that are insoluble in water are used favorably.

It is preferable to introduce an oil-solubilizing group on the basic structure of the dye for use in the invention described above, to ensure that the dye is dissolved in the amount desirable in the ink composition.

Examples of the oil-solubilizing groups include long-chain branched alkyl groups, long-chain branched alkoxy groups, long-chain branched alkylthio groups, long-chain branched alkylsulfonyl groups, long-chain branched acyloxy groups, long-chain branched alkoxycarbonyl groups, long-chain branched acyl groups, long-chain branched acylamino groups, long-chain branched alkylsulfonylamino groups, long-chain branched alkylaminosulfonyl groups, as well as aryl, aryloxy, aryloxycarbonyl, arylcarbonyloxy, arylaminocarbonyl, arylaminosulfonyl, and arylsulfonylamino groups containing such a long-chain branched substituent group, and the like.

Alternatively, it is also possible to obtain a dye by introducing an oil-solubilizing group, such as an alkoxycarbonyl, aryloxycarbonyl, alkylaminosulfonyl or arylaminosulfonyl group, to a water-soluble dye containing a carboxylic or sulfonic acid group with a long-chain branched alcohol, amine, phenol, or aniline derivative.

The oil-soluble dye preferably has a melting point of 200° C. or lower, more preferably 150° C. or lower, and still more preferably 100° C. or lower. Use of a low-melting point oil-soluble dye enables restriction of crystal precipitation of the colorant in ink composition and improvement in the storage stability of the ink composition.

The dye preferably has a high oxidation potential, because it improves resistance to discoloration in particular by oxidative substances such as ozone and the hardening efficiency of ink composition. Thus, the oil-soluble dye for use in the invention preferably has an oxidation potential of 1.0 V or more (vsSCE). The oxidation potential is preferably higher, and thus a dye having an oxidation potential of 1.1 V or more (vsSCE) is more preferably, and that of 1.15 V or more (vsSCE) and 2.0 V or less, particularly preferable.

The yellow dyes having the structure represented by Formula (Y-I) described in JP-A 2004-250483 are preferable. The disclosure is incorporated by reference herein.

Examples of particularly preferable dyes include the dyes represented by Formulae (Y-II) to (Y-IV) described in JP-A No. 2004-250483, which is incorporated by reference herein, paragraph No. [0034], and typical examples thereof include the compounds described in JP-A No. 2004-250483, which is incorporated by reference herein, paragraph Nos. [0060] to [0071]. The oil-soluble dyes represented by Formula (Y-I) described therein may be used not only in yellow ink but also in inks in any other colors such as black and red.

The compounds having the structures represented by Formulae (3) and (4) described in JP-A No. 2002-114930, which is incorporated by reference herein, are preferable as the magenta dyes; and typical examples thereof include the compounds described in JP-A No. 2002-114930, paragraph Nos. [0054] to [0073].

Particularly preferable dyes include the azo dyes represented by Formulae (M-1) to (M-2) described in JP-A No. 2002-121414, which is incorporated by reference herein, paragraph Nos. [0084] to [0122], and typical examples thereof include the compounds described in JP-A No. 2002-121414, paragraph Nos. [0123] to [0132]. The oil-soluble dyes represented by Formulae (3), (4), and (M-1) to (M-2) may be used not only in magenta ink but also in inks in any other colors such as black and red.

Favorable as the cyan dyes are the dyes represented by Formulae (I) to (IV) described in JP-A No. 2001-181547 and the dyes represented by Formulae (IV-3) to (IV-4) in JP-A No. 2002-121414, paragraph Nos. [0063] to [0078]; and typical examples thereof include the compounds described in JP-A 2001-181547, paragraph Nos. [0052] to [0066] and in JP-A 2002-121414, paragraph Nos. [0079] to [0081].

Particularly preferable dyes are the phthalocyanine dyes represented by Formulae (C-I) and (C-II) described in JP-A No. 2002-121414, which is incorporated by reference herein, paragraph Nos. [0133] to [0196]; and still more preferable are the phthalocyanine dyes represented by Formula (C-II). Typical examples thereof include the compounds described in JP-A No. 2002-121414, paragraph Nos. [0198] to [0201]. The oil-soluble dyes represented by Formulae (I) to (IV), (IV-1) to (IV-4), (C-I), and (C-II) may be used not only in cyan ink but also in inks in any other colors such as black and green.

Oxidation Potential

The oxidation potential of the dye according to the invention (Eox) can be determined easily by those skilled in the art. These methods are described, for example, in P. Delahay, "New Instrumental Methods in Electrochemistry" (1954, Interscience Publishers), A. J. Bard et al., "Electrochemical Methods" (1980, John Wiley & Sons), and Akira Fujishima et al., "Electrochemical Measurement Methods" (1984, Gihodo Shuppan). The disclosures are incorporated by reference herein.

Specifically, the oxidation potential is determined as a value vsSCE (saturated calomel electrode), by dissolving a test sample at a concentration of $1 \times 10^{-2}$ to $1 \times 10^{-6}$ mole/liter in a solvent such as dimethylformamide or acetonitrile containing a supporting electrolyte such as sodium perchlorate or tetrapropylammonium perchlorate; and analyzing the solution by a voltammetry (polarography employing a dropping mercury electrode, cyclic voltammetry, method employing a rotating disk electrode, or the like). The value may deviate to the extent approximately of several dozen millivolts under the influence of the difference in liquid junction potential and the resistivity of the sample solution, but it is possible to assure the reproducibility of electric potential by using a standard sample (e.g., hydroquinone).

In the invention, the value (vsSCE) obtained in N,N-dimethylformamide containing 0.1 mol/liter tetrapropylammonium perchlorate as a supporting electrolyte (dye concentration: 0.001 mol/liter) by using an SCE (saturated calomel electrode) as the reference electrode, a graphite electrode as the working electrode, and a platinum electrode as the counter electrode was used as the oxidation potential of dye.

The value Eox represents the easiness of electron transfer from a sample to the electrode, and a greater value (higher oxidation potential) indicates that the electron transfer from sample to electrode is more difficult or that the sample is less easily oxidized. As for the relationship between the Eox and the structure of compound, introduction of an electron-withdrawing group leads to increase of the oxidation potential, while introduction of an electron-donating group to decrease of the oxidation potential. In the invention, it is preferable to increase the oxidation potential of dye by introducing an electron-withdrawing group thereon, for reducing the reactivity with the electrophilic agent ozone.

Typical examples of the dyes favorably used in the invention will be listed below, but the dyes for use in the invention are not limited to the following typical examples.

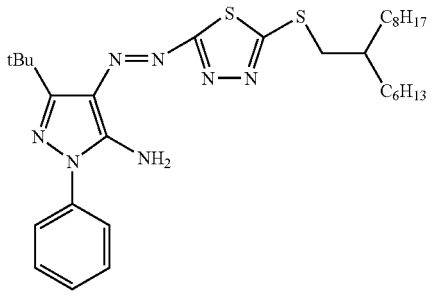
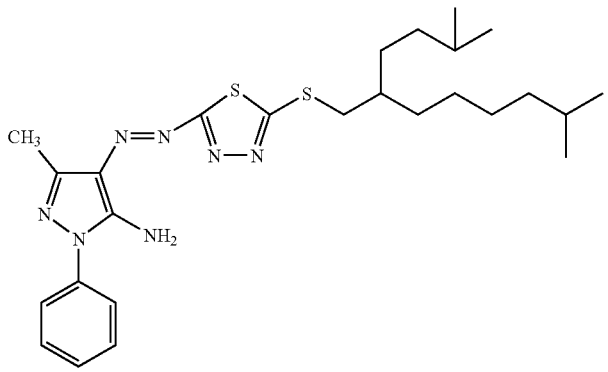
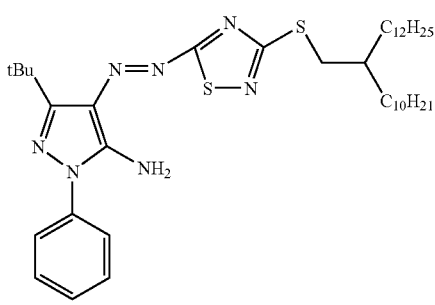
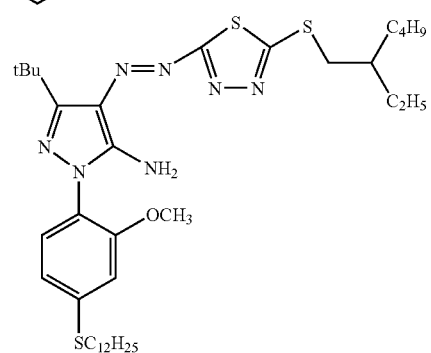
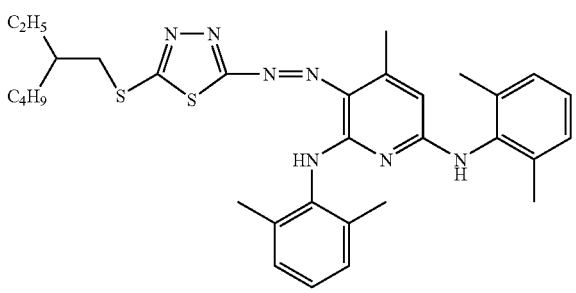
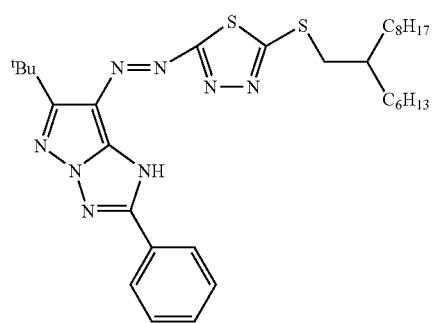
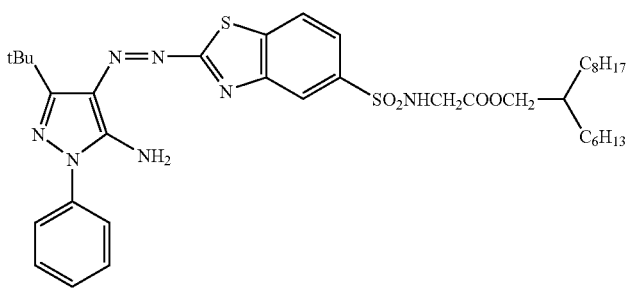
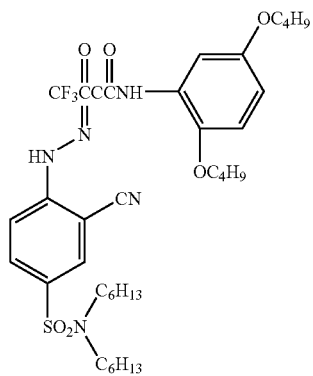

33                                    34
-continued
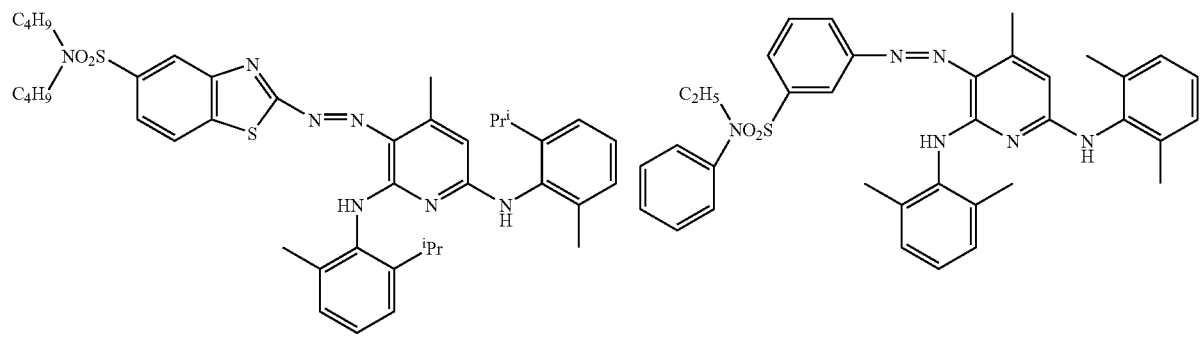
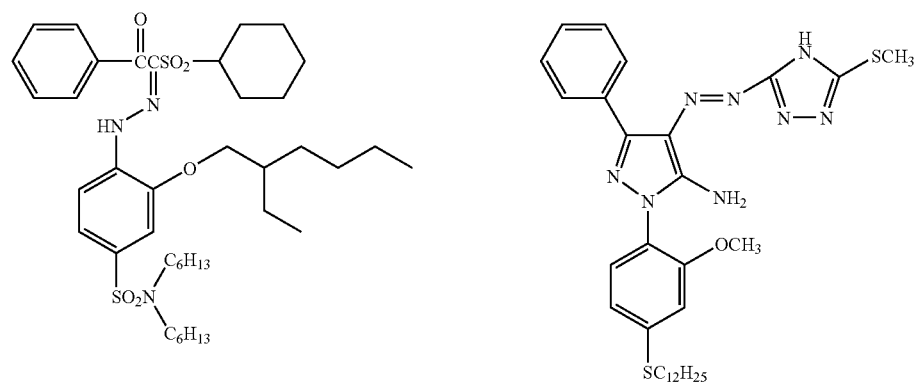
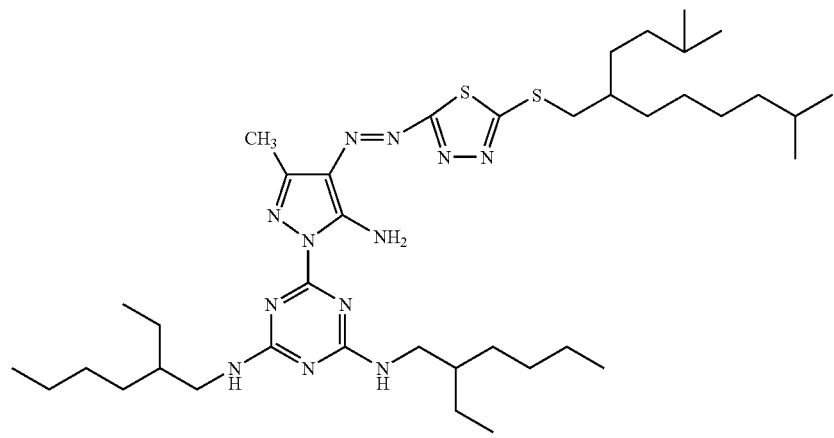
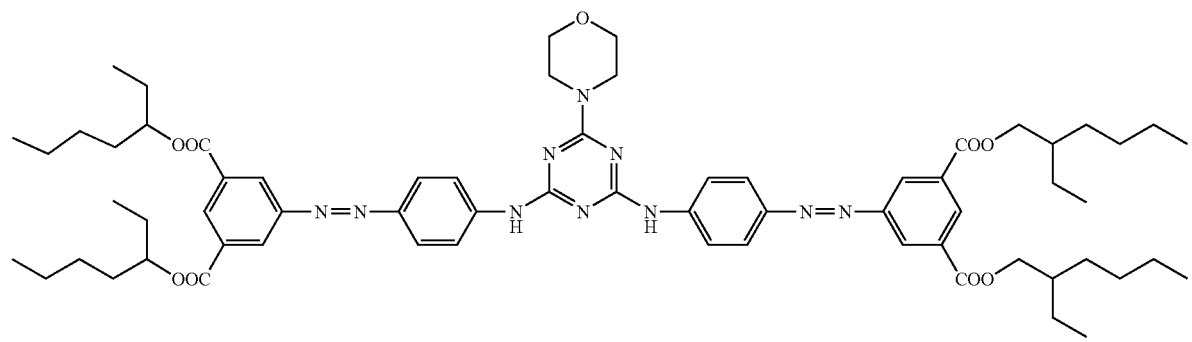

-continued
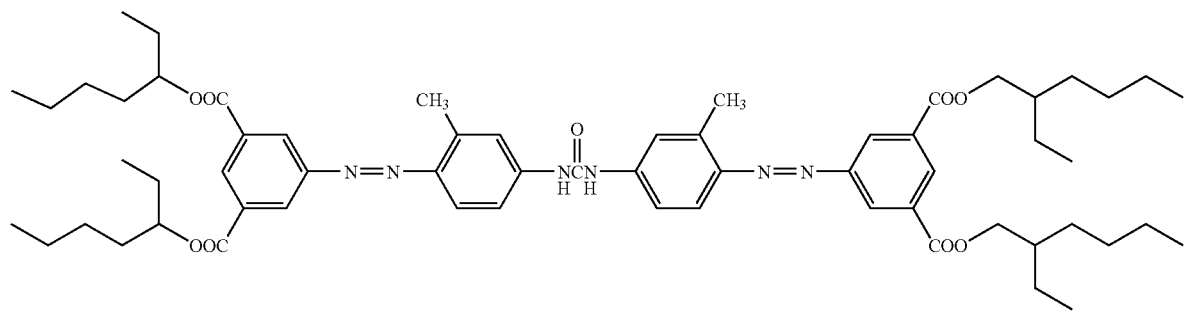
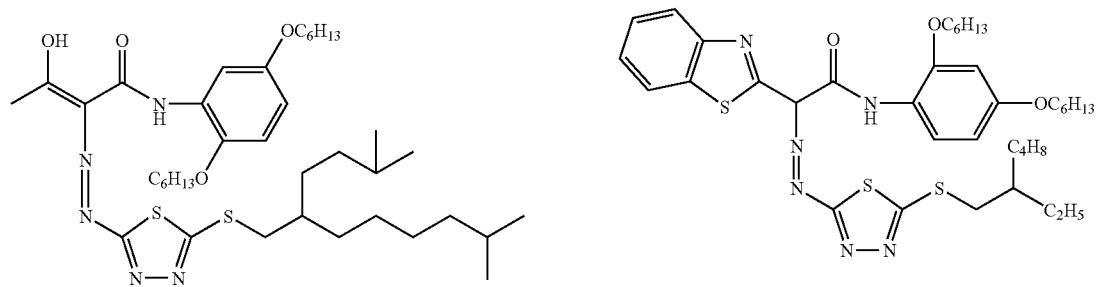
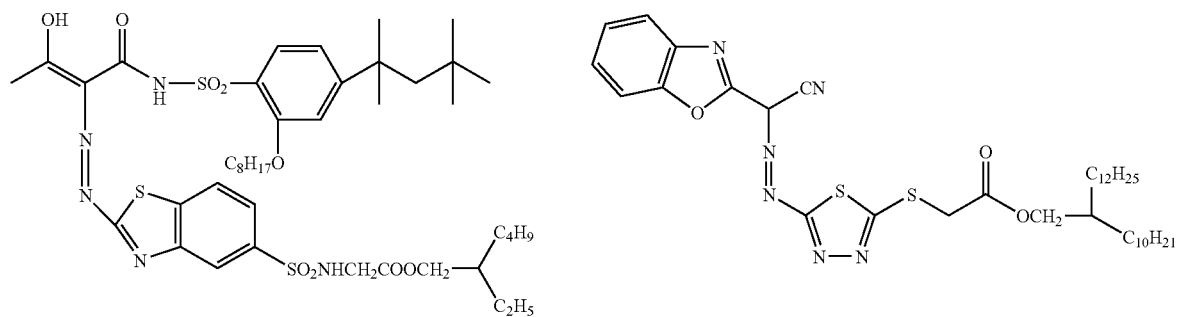
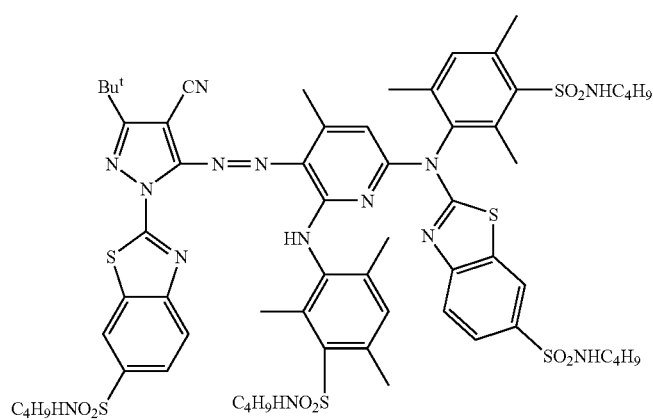

-continued
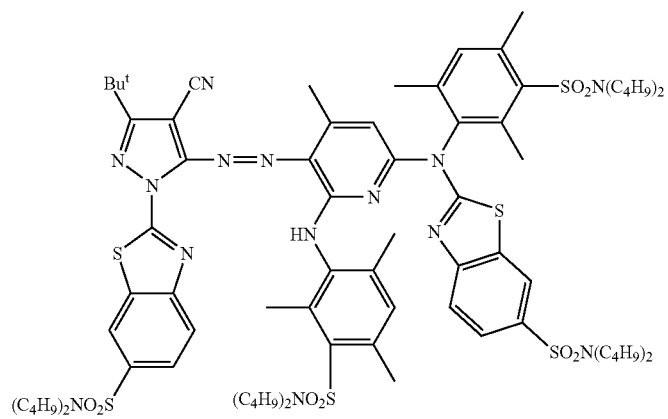
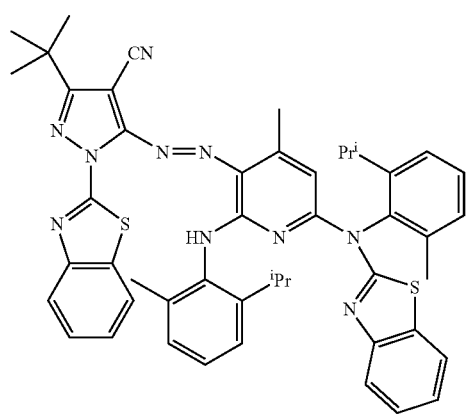
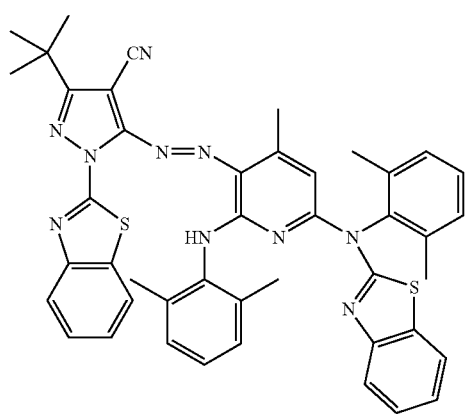
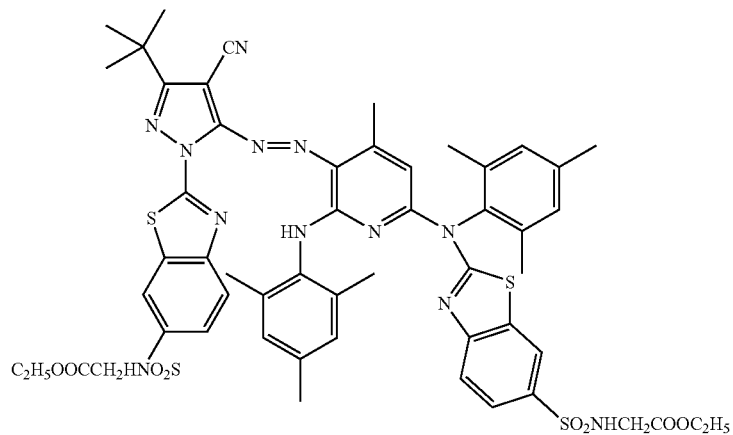
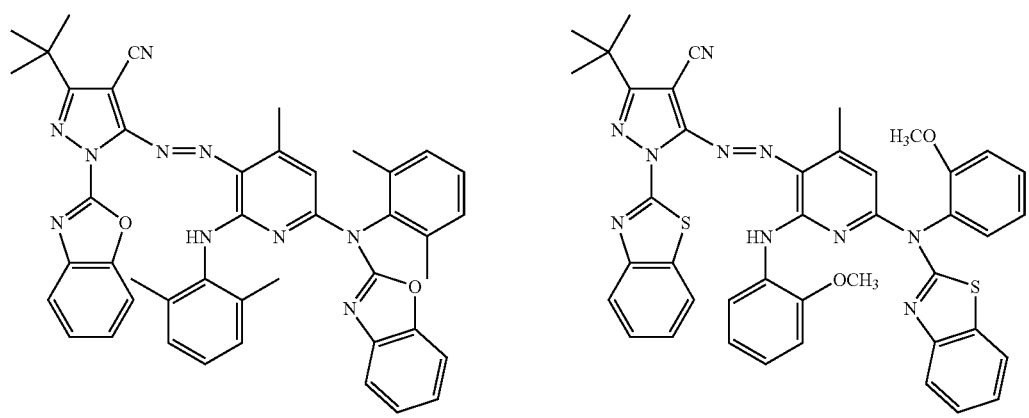

-continued
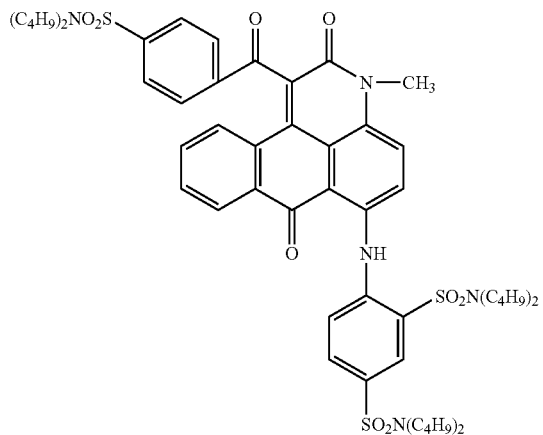
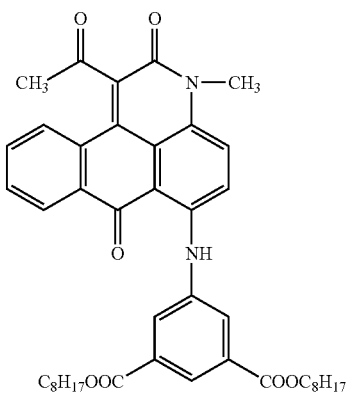
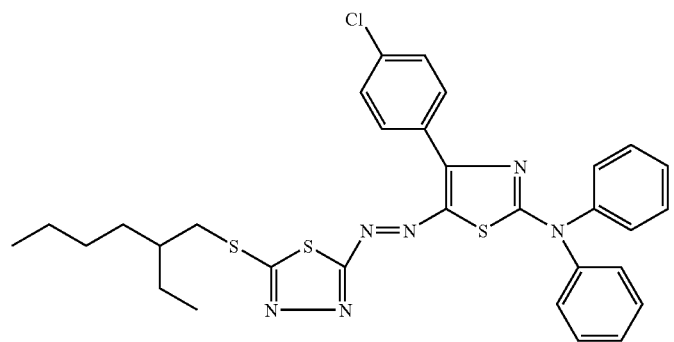
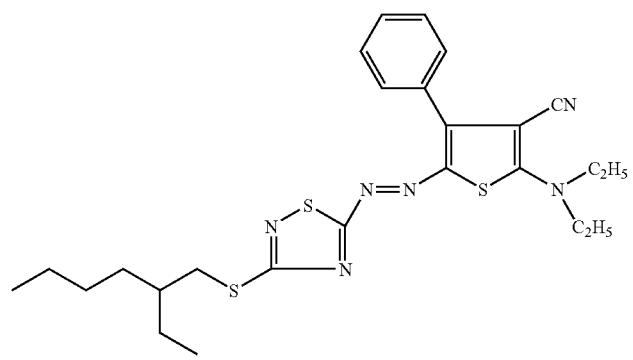
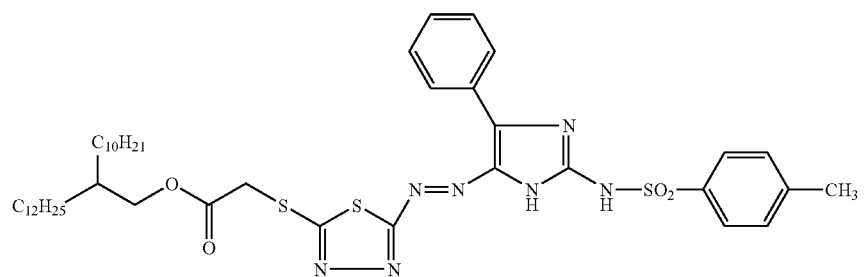

-continued
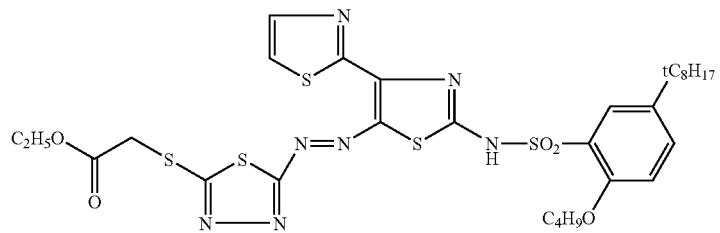
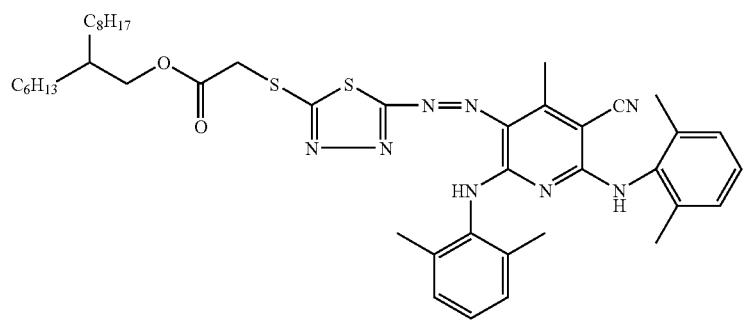
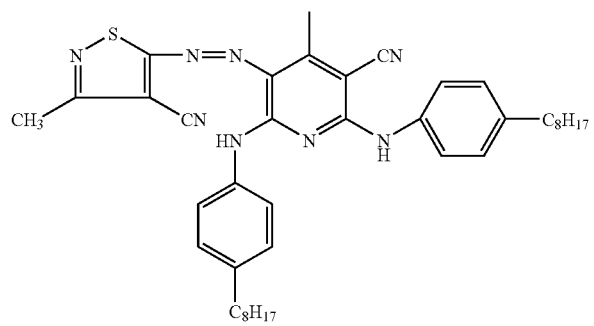
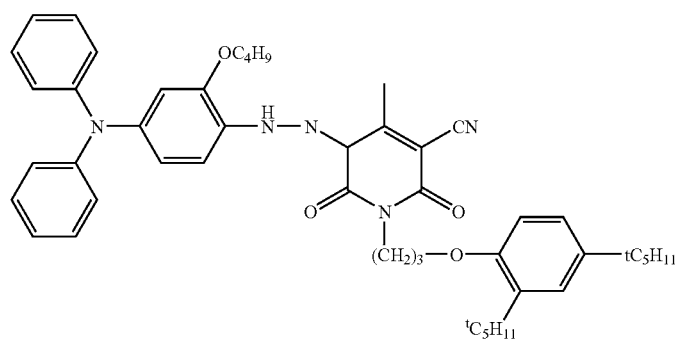

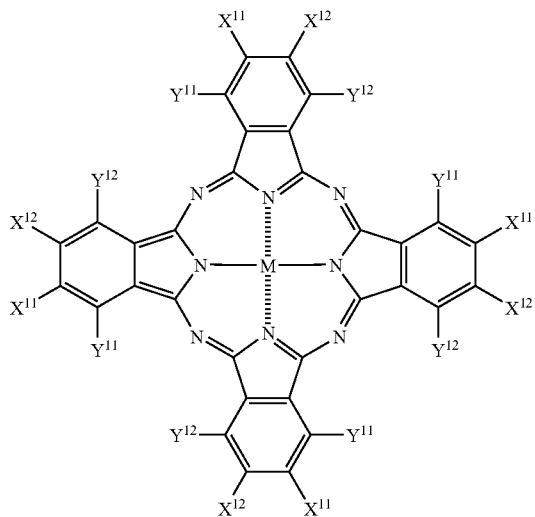

In the FIGURE, typical examples of the pairs (X11, X12) and (Y11, Y12) are respectively shown in random order.

| No. | M | X¹¹ | X¹² | Y¹¹, Y¹² |
|---|---|---|---|---|
| C-1 | Cu | –O₂S–(CH₂)₃–SO₂–NH–CH₂–C(O)–O–CH₂–C(O)–OEt | H | H, H |
| C-2 | Cu | –O₂S–(CH₂)₃–SO₂–NH–CH₂–C(O)–O–CH(CH₃)–C(O)–OEt | H | H, H |
| C-3 | Cu | –O₂S–(CH₂)₃–SO₂–NH–CH₂–C(O)–O–C(C₄H₉)–C(O)–OMe | H | H, H |
| C-4 | Cu | –O₂S–(CH₂)₃–SO₂–NH–CH(CH₃)–C(O)–O–CH(C₄H₉)–C(O)–OEt | H | H, H |
| C-5 | Cu | –O₂S–(CH₂)₃–SO₂–NH–CH(CH₃)–C(O)–O–CH₂–C(O)–OEt | H | H, H |
| C-6 | Cu | –O₂S–(CH₂)₃–SO₂–NH–(CH₂)₂–C(O)–O–CH₂–C(O)–OEt | H | H, H |
| C-7 | Cu | –O₂S–(CH₂)₃–SO₂–NH–(CH₂)₂–C(O)–O–(CH₂)₂–C(O)–OEt | H | H, H |

-continued
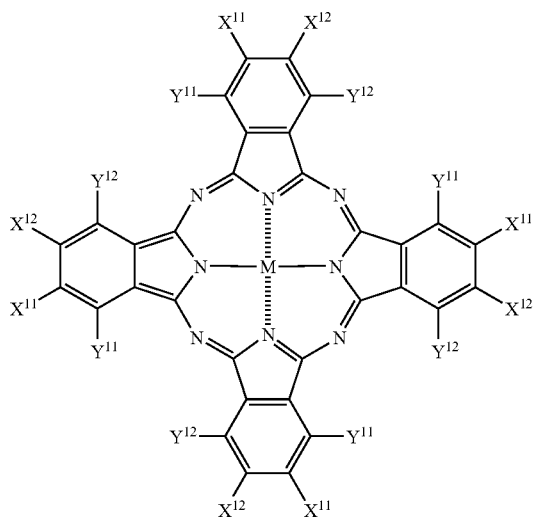
In the FIGURE, typical examples of the pairs (X11, X12) and (Y11, Y12) are respectively shown in random order.
| No. | M | $X^{11}$ | $X^{12}$ | $Y^{11}, Y^{12}$ |
|---|---|---|---|---|
| C-8 | Cu | ⸨O₂S−CH₂CH₂CH₂−S(O₂)−N(Me)−C(O)−O−CH₂−C(O)−OMe | H | H, H |
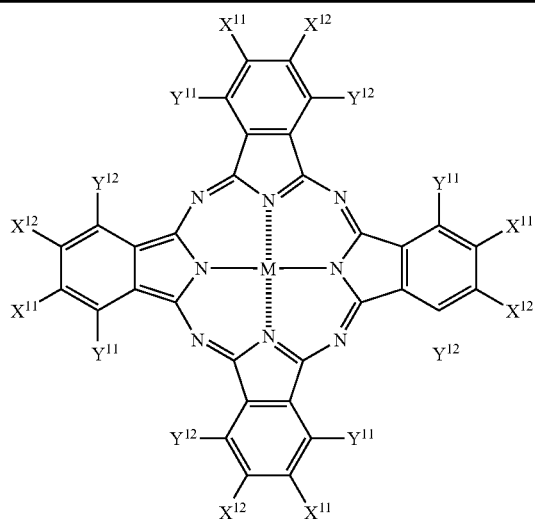
In the FIGURE, typical examples of the pairs (X11, X12) and (Y11, Y12) are respectively shown in random order.
| No. | M | $X^{11}$ | $X^{12}$ | $Y^{11}, Y^{12}$ |
|---|---|---|---|---|
| C-9 | Cu | ⸨O₂S−CH₂CH₂CH₂−S(O₂)−N(Me)−C(O)−O−CH(C₄H₉)−C(O)−OMe | H | H, H |

-continued

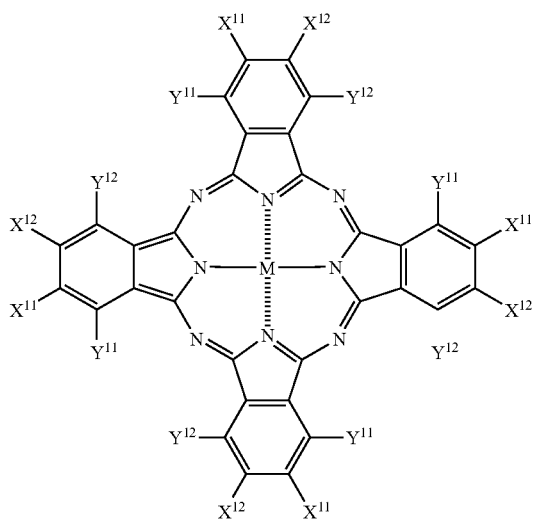

In the FIGURE, typical examples of the pairs (X11, X12) and (Y11, Y12) are respectively shown in random order.

| No. | M | $X^{11}$ | $X^{12}$ | $Y^{11}, Y^{12}$ |
|---|---|---|---|---|
| C-10 | Cu | ~O₂S-(CH₂)₃-SO₂-N(Me)-C(=O)-O-(CH₂)₃-C(=O)-OEt | H | H, H |
| C-11 | Cu | ~O₂S-(CH₂)₃-SO₂-NH-CH₂-C(=O)-O-CH₂-C(=O)-O-CH₂CH(Et)(C₄H₉) | H | H, H |
| C-12 | Cu | ~O₂S-(CH₂)₃-SO₂-NH-CH₂-C(=O)-O-CH(C₄H₉)-C(=O)-O-CH₂CH(Et)(C₄H₉) | H | H, H |
| C-13 | Cu | ~O₂S-(CH₂)₃-SO₂-NH-CH(iPr)-C(=O)-O-CH₂-C(=O)-OEt | H | H, H |
| C-14 | Cu | ~O₂S-(CH₂)₃-SO₂-NH-CH(iPr)-C(=O)-O-CH(Me)-C(=O)-OEt | H | H, H |
| C-15 | Cu | ~O₂S-CH₂-C(=O)-O-CH₂-C(=O)-O-CH₂CH(Et)(C₄H₉) | H | H, H |

-continued
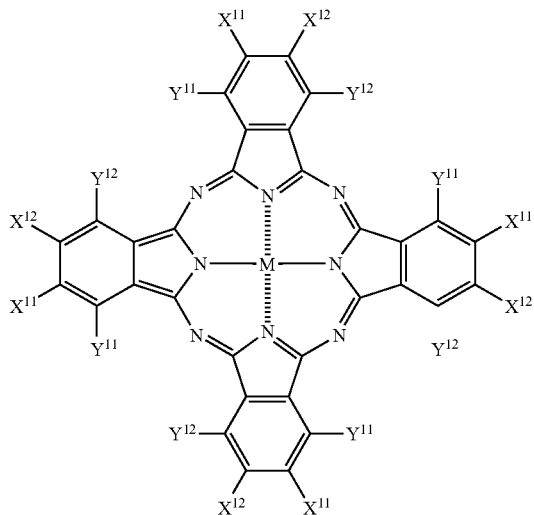
In the FIGURE, typical examples of the pairs (X11, X12) and (Y11, Y12) are respectively shown in random order.
| No. | M | $X^{11}$ | $X^{12}$ | $Y^{11}, Y^{12}$ |
|---|---|---|---|---|
| C-16 | Cu | -O$_2$S-CH$_2$-C(=O)-O-CH$_2$-C(=O)-O-CH$_2$CH$_3$ | H | H, H |
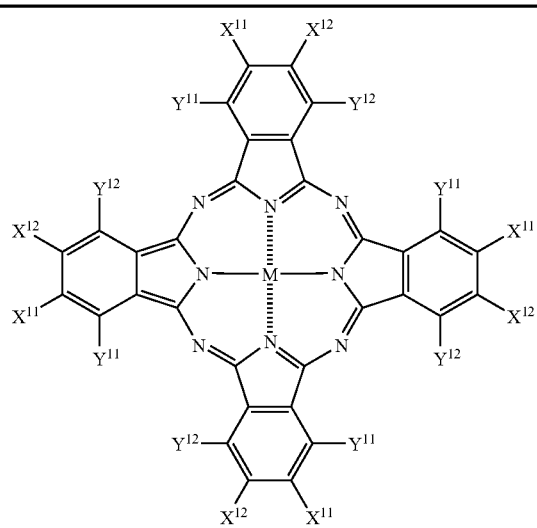
In the FIGURE, typical examples of the pairs (X11, X12) and (Y11, Y12) are respectively shown in random order.
| No. | M | $X^{11}$ | $X^{12}$ | $Y^{11}, Y^{12}$ |
|---|---|---|---|---|
| C-17 | Cu | -O$_2$S-CH$_2$-C(=O)-O-CH$_2$CH$_2$-C(=O)-O-CH$_2$CH$_3$ | H | H, H |

-continued

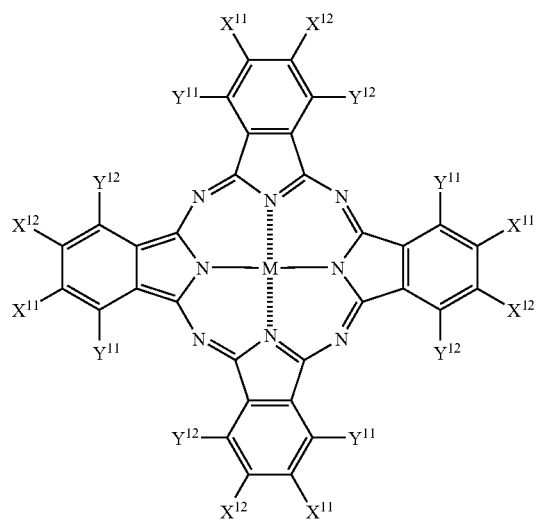

In the FIGURE, typical examples of the pairs (X11, X12) and (Y11, Y12) are respectively shown in random order.

| No. | M | X$^{11}$ | X$^{12}$ | Y$^{11}$, Y$^{12}$ |
|---|---|---|---|---|
| C-18 | Cu | ~O$_2$S-(CH$_2$)$_3$-C(=O)-O-CH$_2$-C(=O)-O-CH$_2$-CH(C$_2$H$_5$)-C$_4$H$_9$ | H | H, H |
| C-19 | Cu | ~O$_2$S-(CH$_2$)$_3$-C(=O)-O-(CH$_2$)$_3$-C(=O)-O-C$_2$H$_5$ | H | H, H |
| C-20 | Cu | ~O$_2$S-(CH$_2$)$_3$-C(=O)-O-CH(C$_4$H$_9$)-C(=O)-O-CH$_3$ | H | H, H |
| C-21 | Cu | ~O$_2$S-(CH$_2$)$_3$-S(O$_2$)-NH-CH$_2$-C(=O)-O-CH$_2$-C(=O)-O-CH$_2$-C(=O)-OEt | H | H, H |
| C-22 | Cu | ~O$_2$S-(CH$_2$)$_3$-S(O$_2$)-N(-CH$_2$-C(=O)-O-CH$_2$-C(=O)-OEt)$_2$ | H | H, H |
| C-23 | Cu | ~O$_2$S-(CH$_2$)$_3$-S(O$_2$)-NH-CH$_2$-C(=O)-O-CH(CH$_2$CH$_2$COOEt)$_2$ | H | H, H |

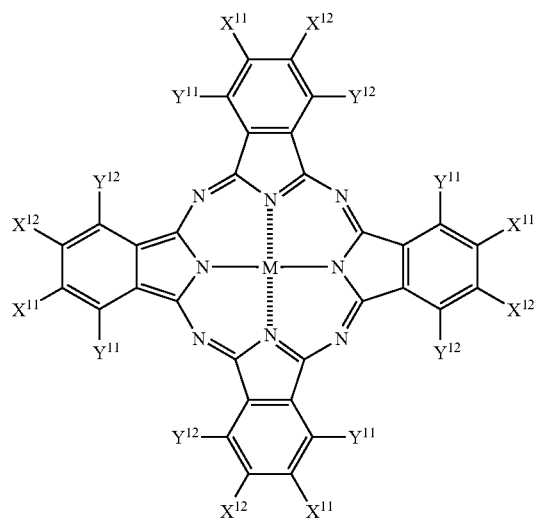

In the FIGURE, typical examples of the pairs (X11, X12) and (Y11, Y12) are respectively shown in random order.

| No. | M | $X^{11}$ | $X^{12}$ | $Y^{11}, Y^{12}$ |
|---|---|---|---|---|
| C-24 | Cu | ~O₂S-(CH₂)₃-S(O₂)-NH-CH(CH₂-O-C(O)-C₂H₅)-CH₂-O-C(O)-C₂H₅ | H | H, H |
| C-25 | Cu | ~O₂S-(CH₂)₃-S(O₂)-NH-CH(CH₃)-C(O)-O-CH₂-C(O)-OEt | H | H, Cl |
| C-26 | Cu | ~O₂S-(CH₂)₃-S(O₂)-NH-(CH₂)₂-C(O)-O-CH₂-C(O)-OEt | H | H, Cl |
| C-27 | Cu | ~O₂S-(CH₂)₃-S(O₂)-NH-(CH₂)₂-C(O)-O-(CH₂)₃-C(O)-OEt | H | H, Cl |
| C-28 | Cu | ~O₂S-(CH₂)₃-S(O₂)-N(Me)-C(O)-O-CH₂-C(O)-OEt | H | H, Cl |
| C-29 | Cu | ~O₂S-(CH₂)₃-S(O₂)-N(Me)-C(O)-O-CH(C₄H₉)-C(O)-OEt | H | H, Cl |

-continued

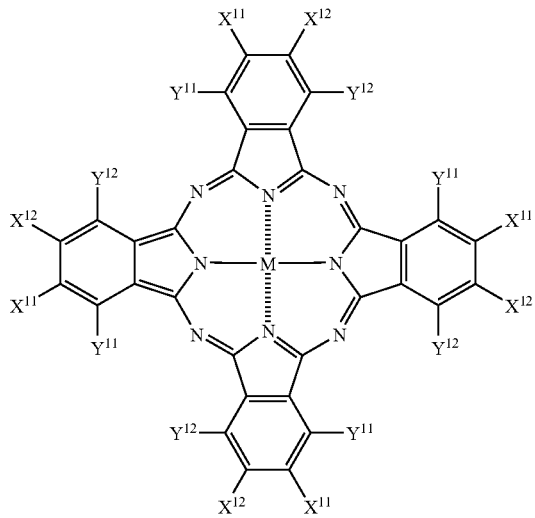

In the FIGURE, typical examples of the pairs (X11, X12) and (Y11, Y12) are respectively shown in random order.

| No. | M | $X^{11}$ | $X^{12}$ | $Y^{11}, Y^{12}$ |
|---|---|---|---|---|
| C-30 | Cu | ⸨O₂S—S(O₂)—N(Me)—C(O)—O—...—OEt⸩ | O, H | H, Cl |

Other Components

Hereinafter, various additives used additionally as needed in the ink composition of the invention will be described.

Ultraviolet Absorbent

An ultraviolet absorbent may be added to the ink composition of the invention, for improvement in the weather fastness and prevention of the discoloration of the image obtained.

Examples of the ultraviolet absorbents include the benzotriazole compounds described in JP-A Nos. 58-185677, 61-190537, 2-782, 5-197075 and 9-34057 and others; the benzophenone compounds described in JP-A Nos. 46-2784 and 5-194483, U.S. Pat. No. 3,214,463, and others; the cinnamic acid compounds described in JP-B Nos. 48-30492 and 56-21141, JP-A No. 10-88106, and others; the triazine compounds described in JP-A Nos. 4-298503, 8-53427, 8-239368, 10-182621, and 8-501291, and others; the compounds described in Research Disclosure No. 24239; compounds emitting light by absorbing ultraviolet ray such as stilbene and benzoxazole compounds; so-called fluorescent brighteners; and the like.

The addition amount may be decided suitably according to applications, but is generally, approximately 0.01 to 10% by mass as solid matter.

Antioxidant

An antioxidant may be added, for improvement of the stability of ink composition.

Examples of the antioxidants include those described in European Patent Laid-Open Nos. 223739, 309401, 309402, 310551, 310552, and 459416, German Patent Laid-Open No. 3435443, JP-A Nos. 54-48535, 62-262047, 63-113536, 63-163351, 2-262654, 2-71262, 3-121449, 5-61166, and 5-119449, U.S. Pat. Nos. 4,814,262 and 4,980,275, and others.

The addition amount is decided properly according to applications, but generally, approximately 0.001 to 1% by mass as solid matter.

Discoloration Inhibitor

Any one of various organic and metal complex-based discoloration inhibitors may be used in the ink composition of the invention. Examples of the organic discoloration inhibitors include hydroquinones, alkoxyphenols, dialkoxyphenols, phenols, anilines, amines, indanes, chromanes, alkoxyanilines, heterocyclic rings, and the like. Examples of the metal-complex discoloration inhibitors include nickel complexes, zinc complexes, and the like; and typical examples thereof include the compounds described in the patents cited in Research Disclosure No. 17643 (sections VII-I to J), ibid., No. 15162, ibid., No. 18716 (left column on p. 650), ibid., No. 36544 (p. 527), ibid., No. 307105 (p. 872), and ibid., No. 15162; and the compounds included in the Formula of typical compounds and the exemplary compounds described in JP-A No. 62-215272, pp. 127 to 137.

The addition amount is decided properly according to applications, but generally, approximately 0.001 to 5% by mass.

Conductivity Salt

A conductive salt such as potassium thiocyanate, lithium nitrate, ammonium thiocyanate, or dimethylamine hydrochloride may be added to the ink composition of the invention, for control of the physical properties during ejection.

The addition amount is decided properly according to applications, but generally, approximately 0.001 to 1.0% by mass in the ink composition.

Solvent

Addition of an extremely small amount of organic solvent to the ink composition of the invention is effective for improving adhesiveness to the recording medium.

Examples of the solvents include ketone solvents such as acetone, methylethylketone, and diethylketone; alcohol solvents such as methanol, ethanol, 2-propanol, 1-propanol, 1-butanol, and tert-butanol; chlorine-based solvents such as chloroform and methylene chloride; aromatic solvents such as benzene and toluene; ester solvents such as ethyl acetate, butyl acetate, and isopropyl acetate; ether solvents such as diethylether, tetrahydrofuran, and dioxane; glycol ether solvents such as ethylene glycol monomethylether and ethylene glycol dimethylether; and the like. In such a case, the amount of the solvent added is in the range that does not cause problems of VOCs and deterioration in solvent resistance, and thus, preferably in the range of 0.1 to 5% by mass, more preferably 0.1 to 3% by mass, in the entire ink composition.

Polymer Compound

Various polymer compounds may be added to the ink composition, for adjustment of film physical properties. Examples of the polymer compounds include styrene polymers, acrylic polymers, cyclic ether polymers, polyvinylbutyral resins, polyurethane resins, polyamide resins, polyester resins, epoxy resins, phenol resins, polycarbonate resins, polyvinylbutyral resins, polyvinyl formal resins, shellac, vinyl resins, acrylic resins, rubber-based resins, waxes, other natural resin, and the like. These resins may be used in combination of two or more. Among them, copolymers of a styrene monomer, an acrylic monomer, and a cyclic ether are preferable. In addition, copolymers having a "cyclic ether group-containing monomer" or a "vinylether group-containing monomer" as the copolymerization component of polymer binder are also used favorably.

The addition amount is decided properly according to applications, but generally, approximately 0.01 to 10.0% by mass in the ink composition.

Surfactant

The surfactants include those described in JP-A Nos. 62-173463 and 62-183457. Examples thereof include anionic surfactants such as dialkylsulfosuccinic acid salts, alkylnaphthalenesulfonic acid salts, and fatty acid salts; nonionic surfactants such as polyoxyethylene alkylethers, polyoxyethylene alkylallylethers, acetylene glycols, and polyoxyethylene-polyoxypropylene block copolymers; cationic surfactants such as alkylamine salts and quaternary ammonium salts; and the like. An organic fluoro-compound may be used instead of the surfactant. The organic fluoro-compound is preferably hydrophobic. Examples of the organic fluoro-compounds include fluorochemical surfactants, oily fluorochemical compounds (e.g., fluorine oil) and solid fluorochemical compound resins (e.g., tetraethylenefluoride resin); and typical examples thereof include those described in JP-B No. 57-9053 (Columns 8 to 17) and JP-A No. 62-135826.

The addition amount is decided properly according to applications, but generally, approximately 0.001 to 5.0% by mass in the ink composition.

In addition, a leveling additive, a matting agent, a wax for adjustment of film physical properties, or a tackifier for improvement of the adhesiveness to recording medium, such as of polyolefin and PET, that does not inhibit polymerization may be added as needed to the ink composition of the invention.

Typical examples of the tackifiers include the high-molecular weight adhesive polymers described in JP-A 2001-49200, pp. 5 to 6 (e.g., copolymers of a (meth)acrylic ester and an alcohol with an alkyl group having 1 to 20 carbons, of a (meth)acrylic ester and an alicyclic alcohol having 3 to 14 carbons, and of a (meth)acrylic ester and an aromatic alcohol having 6 to 14 carbons), and low-molecular weight adhesive resin containing a polymerizable unsaturated bond, and the like.

Considering the ejection efficiency when applied to inkjet-recording, the ink composition of the invention preferably has an ink viscosity of 5 to 30 mPa·s, more preferably 7 to 20 mPa·s, at the ejection temperature, and thus, it is preferable to adjust and determine the ink composition properly so that the viscosity thereof falls in the range above. The viscosity of the ink composition at 25° C. is 10 to 300 mPa·s and preferably 10 to 100 mPa·s. By increasing the viscosity at room temperature, it become possible to prevent penetration of the ink into recording medium even when a porous recording medium is used, reduce the amounts of unhardened monomer and odor, suppress ink bleeding after an ink droplet is ejected, and consequently improve the quality of the resulting image. An ink viscosity of lower than 10 mPa·s at 25° C. is not effective in preventing the ink bleeding, while an ink viscosity of more than 300 mPa·s leads to a problem in ink delivery.

The surface tension of the ink composition of the invention is preferably 20 to 40 mN/m and more preferably 20 to 30 mN/m. For use of the ink on various recording media such as polyolefin or PET sheet, coated paper, and non-coated paper, the surface tension of the ink is preferably 20 mN/m or more for prevention of ink bleeding and penetration, and 30 mN/m or less for improvement in the compatibility therewith.

Inkjet-Recording Method and Inkjet-Recording Apparatus

The ink composition of the invention thus prepared is used favorably as an inkjet-recording ink. In other words the inkjet printing composition which includes the ink composition of the invention is suitable for inkjet printing.

The ink-jet recording method by using the ink composition of the invention includes at least process selected from ejecting the ink composition of the invention on a recording medium or hardening the ink composition of the invention. The ink-jet recording method of the invention may include ejecting the ink composition of the invention on a recording medium by an inkjet printer and hardening the ejected ink composition by irradiation of active radiation ray. As a result, a character and/or an image are recorded on the recording medium with the ejected ink composition.

A printed material of the invention is made by using the ink composition of the invention. Therefore, the printed material of the invention includes a hardened composition obtained by hardening the ink composition of the invention Printed materials obtained by using the ink composition of the invention have image regions that are hardened by irradiation of a radiation ray such as ultraviolet ray and superior in the strength thereof, and thus, the process may be used in various applications, for example, in forming the ink-receiving layer (image region) of planographic printing plate, in addition to forming an image.

The inkjet-recording method and the inkjet-recording apparatus favorably used in the invention will be described below.

In the inkjet-recording method of the invention, an image is formed by using the inkjet-recording ink above, and the ink nozzle and others for use then are not particularly limited and may be selected properly according to applications. It is possible to use the inkjet-recording method described in JP-A No. 2001-279141, paragraph No. [0247]. Particularly preferable are electric charge-controlling, pressure pulse, and acoustic inkjet methods.

In the inkjet-recording method, it is preferable to eject the ink composition above after the viscosity of ink composition is lowered to 5 to 30 mPa·s by heating it to 40 to 80° C.; and in this manner, it is possible to obtain high ejection stability. Generally, radiation-hardening ink compositions are usually more viscous than aqueous inks, and the fluctuation in the viscosity of radiation-hardening ink compositions due to the fluctuation in temperature during printing is greater. The fluctuation in the viscosity of ink composition affects significantly the size and the injection speed of ink droplet, leading to deterioration in image quality, and thus, it is necessary to keep the temperature of the ink composition as constant as possible during printing. The range of the temperature of ink composition is preferably controlled to temperature setting ±5° C., more preferably temperature setting ±2° C., and still more preferably temperature setting ±1° C.

The inkjet-recording apparatus characteristically has means of stabilizing the temperature of ink composition, and all pipings and parts from ink tank (intermediate tank if present) to nozzle injection face are controlled to a particular constant temperature.

The method of controlling temperature is not particularly limited, but, for example, each piping unit is preferably monitored by a temperature sensor and heated for proper control of the temperature according to the flow of ink therein and the environment temperature. In addition, the head unit to be heated is preferably, thermally insulated or protected, for prevention of the influence of external air temperature on the apparatus. It is preferable to insulate the heating unit from other units and reduce the heat capacity of the entire heated unit, for shortening the start-up time needed for heating or for reducing the loss in heat energy.

Conditions of irradiating radiation ray will be described below. A basic irradiation method is disclosed in JP-A No. 60-132767. Specifically, two light sources are placed at both sides of an head unit, and the head unit and the light sources scan in the shuttle mode. the ink composition is ejected on the recording medium and then, irradiated with active radiation ray after a particular period. In addition, the ink composition is hardened completely by irradiation of light from another stationary light source. WO 99/54415 discloses an irradiation method of using an optical fiber and irradiating UV ray on a recording area (region where ink composition is ejected) by guiding a collimated light to a mirror surface on the side wall of head unit. The irradiation method may also be used in the invention.

It is also preferable in the invention to heat the ink composition to a particular temperature and shorten the period from ejection to irradiation to 0.01 to 0.5 second, more preferably 0.01 to 0.3 second, and still more preferably 0.01 to 0.15 second. By shortening the period from ejection to irradiation to an extremely short period, it becomes possible to prevent ink bleeding before hardening of the ejected ink. It also becomes possible to irradiate an ink composition before penetration thereof into the depth in a porous recording medium to which no light is penetrable and suppress the amount of residual unreacted monomer and consequently the amount of odor. The inkjet-recording method described above and the ink composition of the invention provides a synergic effect when used in combination. In particular, use of an ink composition having an ink viscosity of 10 to 300 MP·s at 25° C. is very effective. By using such a recording method, it is possible to make the dot diameter of ejected ink composition constant and obtain an image improved in quality even on various recording media different in surface wettability. For obtaining a color image, it is preferable to form images one by one from a color image lower in lightness. If inks lower in lightness are ejected superimposed, the radiation ray does not reach to the lower ink easily, often leading to deterioration in hardening efficiency, increase in the amount of residual monomer, generation of odor, and deterioration in adhesiveness. Although it is possible to irradiate active radiation ray on a full-color image consisting of multiple inks different in color simultaneously, it is Preferable to irradiate light on each color image one by one for acceleration of hardening.

The inkjet-recording apparatus for use in the invention is not particularly limited, and any one of commercially available inkjet-recording apparatuses may be used. That is, in the invention, an image can be recorded on a recording medium by any one of commercially available inkjet-recording apparatuses.

Recording Medium

The ink composition of the invention may be used favorably, for example, in printing images on known recording media.

The recording media, to which the ink composition of the invention is applicable, is not particularly limited, and include papers such as common plain paper, coated and non-coated papers, inkjet paper, and electrophotographic common-use paper and various non-absorptive resin materials for use in so-called soft packaging, and resin films thereof in the film shape; and typical examples of the various plastic films include PET film, OPS film, OPP film, ONy film, PVC film, PE film, TAC film, and the like. Examples of the other plastics for use as the recording medium material include Polycarbonate, acrylic resins, ABS, polyacetal, PVA, rubbers, and the like. In addition, metal, glass, cloth, and ceramics are also usable as the recording media. It is also possible to use the recording medium described in JP-A No. 2001-181549 and JP-A No. 2001-279141, paragraph Nos. [0228] to [0246].

EXAMPLES

Hereinafter, the present invention will be described more specifically with reference to Examples, but it should be understood that the invention is not restricted by these Examples. "%" in the following Examples means "% by weight", unless specified otherwise.

Examples 1 to 6 and Comparative Examples 1 to 4

The polymerizable compounds, polymerization initiator, and the colorant shown in Table 1 were mixed and blended in the amounts shown therein, to give dye or pigment inks respectively.

The compounds in the Table below are respectively the followings:

1: Compound represented by Formula-1 below

The compound represented by Formula-1 was prepared by reacting the Grignard reagent of chloromethylstyrene with 1,6-hexane dibromide.

2: 3,7-Bis(3-oxetanyl)-5-oxa-nonane (OXT-221, manufactured by Toagosei Co., Ltd.)

3: 3,4-Epoxycyclohexylmethyl-3',4'-epoxycyclohexanecarboxylate (Celoxide 2021A, manufactured by Daicel-UCB Co.)

4: Compound represented by Formula-2 below

Ethylene glycol butylvinylether (manufactured by Aldrich)

5: HDDA (1,6-hexanediol diacrylate, manufactured by Daicel-UCB Co.)

6: DEGDA (diethylene glycol diacrylate)

7: Photocationic polymerization initiator, a triphenylsulfonium salt (UV 1-6992, manufactured by Dow Chemical Company)

8: Photoradical polymerization initiator, an acylphosphine oxide (TOP-L, manufactured by BASF Japan)

9: Compound represented by Compound M-1 below, oxidation potential: 1.39 V (as determined by using ALS Model 610A manufactured by CH Instruments)

10: 8.42 g of potassium ethoxide and 60 ml of ethyl alcohol were added to a 200 ml three-mouthed flask, stirred and solved. Then, 16.2 g of p-acetoxy styrene were dropped into the resulted solution under an ice bath. After stirring for 30 minutes, 11.3 g of 1,6-hexane dibromide and 38 g of potassium carbonate were added and stirred for 8 hours at 50° C. After water was added to the reaction solution, the reactant was extracted with ethyl acetate and the solvent was removed under reduced pressure. The generated substance is recrystallized from acetonitrile and dried under reduced pressure to obtain 8.4 g of the compound represented by Formula 3 below as a light-brown crystal.

11: Pigment dispersion P-2, prepared as follows:

10 g of Pigment Yellow 12, 5 g of a polymer dispersant (Solsperse series product, manufactured by Avecia), and 85 g of 4-metoxy styrene were dispersed in a known dispersing machine to a pigment particle diameter in the range of 0.2 to 0.3 μm, and the mixture was filtered under heat, to give the pigment dispersion.

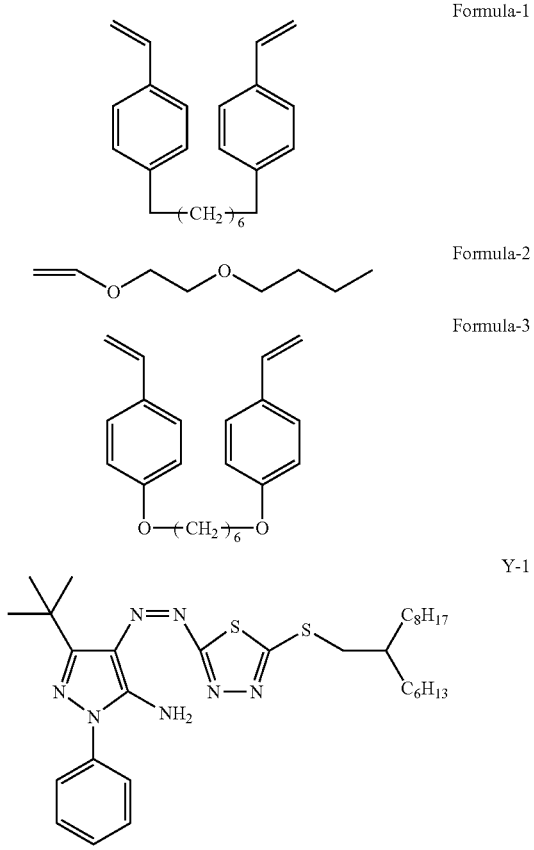

Formula-1

Formula-2

Formula-3

Y-1

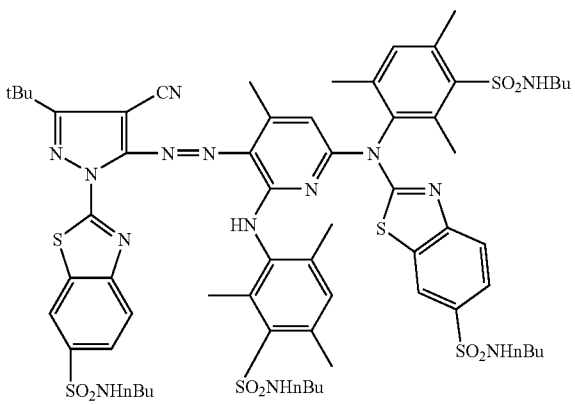

M-1

Each of the ink compositions obtained was ejected on an art paper by an inkjet printer (printing density: 300 dpi, ejection frequency: 4 kHz, nozzle number: 64) to print a solid image having size of 5 centimeters square, and the image formed was exposed to a light from a Deep UV lamp (SP-7, manufactured by Ushio Inc.) under an exposure condition of 15 mJ/cm$^2$, to give a print sample. The sample was evaluated in the following tests after 10 minutes after printing.

Hardening Efficiency

The printed face was evaluated in a tack-free test. The hardening efficiency was evaluated by pressing a finger on a printed hardened film, and the film that feels non-tacky was ranked A, slightly tacky B, and significantly tacky C.

Among the samples ranked A, a printed sample that feels non-tacky even after exposure to a light from the Deep UV lamp at an exposure energy of 7.5 mJ/cm$^2$ was ranked S.

Adhesiveness

The hardened film having size of 1 centimeters square at the center of the printed portion was cut vertically and horizontally multiple times at an interval of 1 mm, an adhesive tape was bonded like covering all of the surface and then peeled off. The hardened film remaining on the base material was observed visually. The hardened film without exfoliation was ranked A; with exfoliated film in an amount of less than 50%, B; with exfoliated film in an amount of 50% or more C; and unevaluated because of insufficient hardening, D.

Lightfastness

The printed art paper was irradiated with a xenon light (100,000 lux) for 3 days in a weather meter (Atlas C. 165). Then, the printed image densities before and after xenon irradiation were determined by using a reflection densitometer (X-Rite 310TR), to give a colorant residual ratio. The colorant residual ratio is the ratio of the printed image densities after xenon irradiation to the printed image densities before xenon irradiation. The results were grouped into four ranks:

A: a colorant residual ratio of 80% or more

B: a colorant residual ratio of less than 80%,

C: a colorant residual ratio of less than 70%

D: a measurement was unable due to insufficient curing.

Ink Stability 1 g of the ink prepared was placed in a 5-ml test tube and left at room temperature for two weeks, and sedimentation of the ink was evaluated. The ink without change was ranked A; and with sedimentation, C.

Respective evaluation results are summarized in Table 1.

Ejection Stability

When ink was ejected in an inkjet printer, the ink ejected without problem was ranked A, and the ink not ejected C.

TABLE 1

| | | Examples | | | | | | Comparative Examples | | | |
|---|---|---|---|---|---|---|---|---|---|---|---|
| | | 1 | 2 | 3 | 4 | 5 | 6 | 1 | 2 | 3 | 4 |
| Polymerizable compound | 4-Methoxystyrene | 90 | 70 | 70 | 70 | 75 | 75 | | | | |
| | 4-Methylstyrene | | 20 | | | | | | | | |
| | Formula-1*[1] | | | 20 | | | | | | | |
| | Fomula-3*[10] | | | | | 15 | 15 | | | | |
| | OXT-221*[3] | | | | 10 | | | 90 | | | |
| | Celoxide 2021A*[3] | | | | 10 | | | | | | |
| | Formula-2*[4] | | | | | | | | 90 | | |
| | Tetrahydrofuran | | | | | | | | | 90 | |
| | HDDA*[5] | | | | | | | | | | 80 |
| | DEGDA*[6] | | | | | | | | | | 10 |
| Polymerization initiator | UVI-6992*[7] | 5 | 5 | 5 | 5 | 5 | 5 | 5 | 5 | 5 | |
| | TPO-L*[8] | | | | | | | | | | 5 |
| Colorant | M-1*[9] | 5 | 5 | 5 | 5 | 5 | | 5 | 5 | 5 | 5 |
| | P-2*[11] | | | | | | 5 | | | | |
| Evaluation | Ejection stability | A | A | A | A | A | A | A | A | A | A |
| | Hardening efficiency | S | S | S | S | S | S | C | C | C | C |
| | Adhesiveness | B | B | B | A | A | B | D | D | D | D |
| | Lightfastness | B | A | A | A | B | A | D | D | D | D |
| | Ink stability | A | A | A | A | A | A | A | A | A | A |

As shown in Table 1, any one of the ink compositions in this Example including a styrene group-containing cationically polymerizable compound gave favorable results in ejection stability, hardening efficiency, adhesiveness, lightfastness, and ink stability. The results indicate that by using the ink compositions in this Example it is possible to provide an inkjet-recording ink and an inkjet-recording method that are superior in ink stability, give a favorable image, and are superior in the hardening efficiency and the adhesiveness to recording medium when a dye was used as the colorant.

The ink compositions are also resistant to clogging and give a favorably transparent ink after hardening even when they are ejected on a transparent support.

In contrast, the ink compositions of Comparative Examples that include no styrene group-containing cationically polymerizable compound or the ink compositions of Comparative Examples that include a photo-radical polymerization initiator could not give favorable results in all evaluation items.

As described above, the invention provides an ink composition superior in hardening efficiency and stability. It also provides an inkjet-recording method and a printed material by using the ink composition.

What is claimed is:

1. An ink composition, comprising a cationically polymerizable compound having a styryl or α-methylstyryl group and a photocationic polymerization initiator, wherein the number of the styryl or α-methylstyryl groups in the cationically polymerizable compound having a styryl or α-methylstyryl group is 2 or 3.

2. The ink composition of claim 1, wherein the cationically polymerizable compound having a styryl or α-methylstyryl group is a compound having an electron-donating functional group at least on one of p- and o-positions of the styryl group.

3. The ink composition of claim 2, wherein the electron-donating functional group is an amino, hydroxyl, alkoxy, or alkyl group.

4. The ink composition of claim 2, wherein the electron-donating functional group is an alkoxy, alkyl, or dimethylamino group.

5. The ink composition of claim 1, wherein the total content of the cationically polymerizable compound having a styryl or α-methylstyryl group is 5% by mass to 95% by mass with respect to the total mass of the ink composition.

6. The ink composition of claim 1, wherein the total content of the cationically polymerizable compound having a styryl or α-methylstyryl group is 20% by mass to 95% by mass with respect to the total mass of the ink composition.

7. The ink composition of claim 1, wherein the total content of the cationically polymerizable compound having a styryl or α-methylstyryl group is 30% by mass to 95% by mass with respect to the total mass of the ink composition.

8. The ink composition of claim 1, further comprising a cationically polymerizable compound other than the cationically polymerizable compound having a styryl or α-methylstyryl group.

9. The ink composition of claim 8, wherein the other cationically polymerizable compound is a compound having at least one group selected from oxirane and oxetane groups.

10. The ink composition of claim 1, further comprising a colorant.

11. The ink composition of claim 1, further comprising a pigment or an oil-soluble dye.

12. The ink composition of claim 1, further comprising an oil-soluble dye, wherein the oxidation potential of the oil-soluble dye is at least 1.0 V (vsSCE).

13. An inkjet-recording method comprising;
    ejecting the ink composition of claim 1 on a recording medium.

14. An inkjet-recording method comprising;
    hardening the ink composition of claim 1.

15. An inkjet-recording method comprising;
ejecting the ink composition of claim 1 on a recording medium by an inkjet printer and
hardening the ejected ink composition by irradiating it with an active radiation ray.

16. A printed material comprising; a hardened composition obtained by hardening the ink composition of claim 1.

17. The ink composition of claim 1, wherein the photocationic polymerization initiator is a sulfonium salt.

* * * * *